(12) United States Patent
Guerrero et al.

(10) Patent No.: US 12,359,934 B1
(45) Date of Patent: Jul. 15, 2025

(54) VALIDATION OF A ROAD NETWORK MAP BASED ON LOCATION BOUNDED RULES

(71) Applicant: Zoox, Inc., Foster City, CA (US)

(72) Inventors: Aaron Guerrero, San Francisco, CA (US); Taylor Andrew Arnicar, San Jose, CA (US); Byungil Jeong, San Ramon, CA (US); Era Yuan Yuan Ming, Oakland, CA (US)

(73) Assignee: Zoox, Inc., Foster City, CA (US)

( * ) Notice: Subject to any disclaimer, the term of this patent is extended or adjusted under 35 U.S.C. 154(b) by 354 days.

(21) Appl. No.: 17/733,765

(22) Filed: Apr. 29, 2022

(51) Int. Cl.
*G01C 21/36* (2006.01)
*G01C 21/00* (2006.01)
*G01C 21/34* (2006.01)

(52) U.S. Cl.
CPC ..... *G01C 21/3676* (2013.01); *G01C 21/3461* (2013.01); *G01C 21/3804* (2020.08)

(58) Field of Classification Search
CPC ............ G01C 21/3676; G01C 21/3461; G01C 21/3804
See application file for complete search history.

(56) References Cited

U.S. PATENT DOCUMENTS

| | | | | |
|---|---|---|---|---|
| 2006/0058949 | A1* | 3/2006 | Fogel | G01C 21/3673 345/629 |
| 2012/0274632 | A1* | 11/2012 | Ivanov | G01C 21/3867 345/419 |
| 2013/0339891 | A1* | 12/2013 | Blumenberg | G06F 16/9537 715/771 |
| 2018/0174446 | A1* | 6/2018 | Wang | G08G 1/096716 |
| 2018/0224285 | A1* | 8/2018 | Stajner | G09B 29/004 |
| 2020/0055524 | A1* | 2/2020 | Lacaze | G06V 20/584 |
| 2020/0408543 | A1* | 12/2020 | Herrmann | B60W 60/0025 |
| 2021/0200801 | A1* | 7/2021 | Agrawal | G06F 16/219 |
| 2023/0168106 | A1* | 6/2023 | Velkavrh | G01C 21/387 701/450 |

\* cited by examiner

*Primary Examiner* — Anshul Sood
(74) *Attorney, Agent, or Firm* — EIP US LLP

(57) ABSTRACT

Systems and methods are provided where requests to modify or validate a road network map are received, and a determination is made as to whether a requested modification, or the road network map, is invalid based on a location at which the modification is desired to be made, and rules associated with a corresponding bounded area of the road network map to which the location belongs. Where a requested modification, or the road network map, is determined to be invalid, the modification is inhibited, or a notification is displayed to a user that the road network map violates the set of rules.

20 Claims, 12 Drawing Sheets

VALIDATION OF A ROAD NETWORK MAP BASED ON LOCATION BOUNDED RULES

BACKGROUND

A map of a road network may be used by a navigation system to accurately guide a vehicle along the road network. The map may comprise data structures that are capable of providing information about the roads making up the road network. Information about the road network may include properties of the individual roads and features within them, intersections and relationships between roads, and other characteristics associated with the roads, such as zoning or areas that influence how the vehicle may be expected to operate. To allow the vehicle to continue to navigate the road network, the map may be kept up to date by one or more cartographers (or users who may annotate and/or update such maps).

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
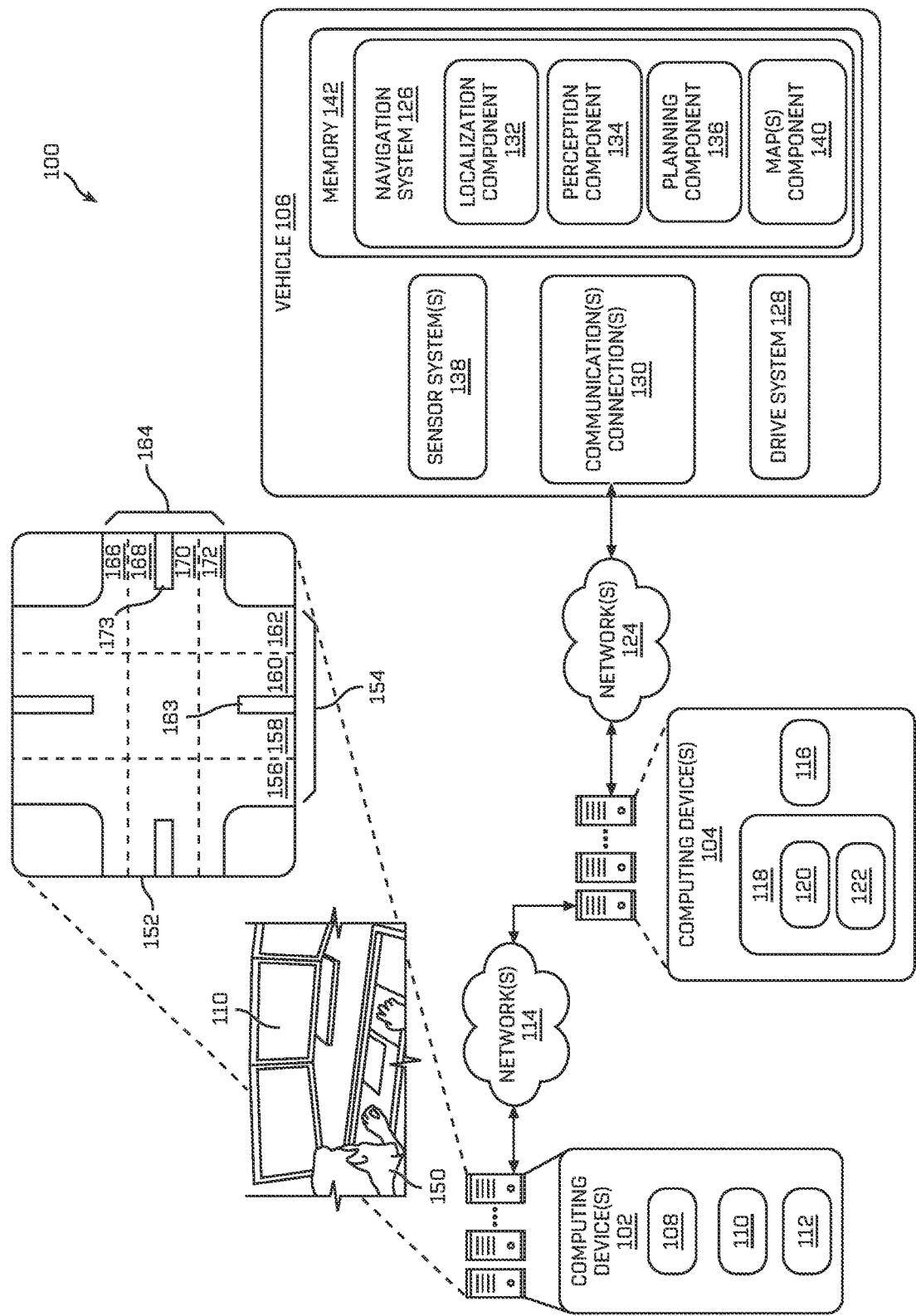
FIG. 1 is a first schematic illustration of a system comprising a vehicle and two computing devices.

Road networks maps used by autonomous vehicles can typically be created and/or maintained by a cartographer. For example, a cartographer can annotate a road network map to indicate viable routes for an autonomous vehicle to take when driving along one or more road segments, and can annotate a road network map to assign a speed limit or the like to a particular road segment of the road network map. Road network maps can be important for vehicles travelling on a road network, for example to ensure that navigation systems are able to operate correctly.

This application relates to systems and methods for controlling requested modifications to, or validations of, a road network map. Where a request to modify or validate one or more elements of a road network map is received from a cartographer, also referred to herein as a user, the request can be processed based on sets of rules that are associated with a particular location of the road network map at which the modification is requested to be made. In particular, different regions or bounded areas of a road network map can correspond to different real-world geo-locations, and different real world geo-locations can comprise different local laws and the like. For example, different states, countries, municipalities, etc, can have differing laws for movement along a road network given any of a type of road, a time of day, an intersection between two road segments, etc. By processing a request in accordance with a set of rules for a particular bounded area of the road network map, requests to add rules to the map associated with vehicle actions, or validate existing rules associated with the map, can be determined to be valid where they comply with the set of rules, and can be determined to be invalid where they do not comply with the set of rules. Valid modification requests can be permitted, enabling the desired modification to be made to the road network map, whilst invalid modification requests can be inhibited, such that the desired modification cannot be made to the road network map. Where a request to validate an element of the road network map shows that the element, or a relationship associated with the element, is invalid, this may be flagged to the user for appropriate remedial action to take place. Systems and methods disclosed herein may thereby ensure accuracy and compliance of road network maps with local legal requirements, and may assist with ensuring that, for example, an autonomous vehicle navigating via use of the road network map complies with any legal requirements associated with the location in which the vehicle is travelling.

Processing of requests based on a set of rules can involve comparing a requested modification or an existing road network map to a set of rules stored in a database. For example, a road network map can comprise a plurality of elements, such as road segments, connections between road segments, features that interact with road segments, or the like. Relationships between elements, as well as the properties or features of individual elements or groups of elements can be defined by data. The data can be arranged by one or more data structures. For example, each of the elements can be associated with a particular data structure that stores data relating to that element. Relationships between elements can be stored as data in one or more other data structures. A request to modify the road network map can involve a request to modify or add data to one or more data structures associated with an element of the road network map. Such proposed modified or new data for the data structure can be compared to data associated with the set of rules, for example data stored in one or more databases, to check for compliance with the set of rules. Similarly, a request to validate the road network map can comprise a request to validate existing data in one or more data structures associated with an element of the road network map. Such existing data can be compared to data associated with the set of rules, for example data stored in one or more databases, to check for compliance with the set of rules. Such data can, for example, comprise semantic and/or absolute data.

An example request to modify a road network map can include a request to define a possible turning of a vehicle from one road segment to another, i.e. a request to define a possible drivable area of the vehicle from one road segment to another. For example, where road segments comprise multiple lanes, it can be desirable to define possible turns or drivable areas of a vehicle from one lane to another. However, in certain locations, for example certain states, particular turns may be deemed illegal. In California, for example, a right turn between multi-lane road segments is only permitted to be carried out without changing lanes during the turn. If, in accordance with the present disclosure, a user submits a request to modify a region of a road network map associated with California to define a possible right turn from a right-most lane of a first road segment to a left-most lane of a second road segment, such a request can be compared with a set of rules associated with California, and deemed to be invalid. Similarly, an existing road network map associated with California in which such a possible right turn is already defined can be compared with a set of rules associated with California, and deemed to be invalid. An indication of an alternative possible turn from the right-most lane of the first road segment to a right-most lane of the second road segment can be provided. In such a manner, the road network map can be maintained in a form that complies with Californian legislation, for example.

Accordingly, techniques (including, but not limited to, a method, a system, and one or more non-transitory computer-readable media) may be provided as discussed herein.

A system 100 is illustrated schematically in FIG. 1, and a comprises a first computing device 102, a second computing device 104, and an autonomous vehicle 106.

The first computing device 102 can comprise one or more processors 108, one or more user interfaces 110, and one or more input devices 112.

The processor(s) 108 of the first computing device 102 can be any suitable processor capable of executing instructions to process data and perform operations as described herein. By way of example and not limitation, the processor(s) 108 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The graphical user interface(s) 110 can comprise any appropriate device suitable for visually displaying information to a user of the computing device 102, and as further shown in FIG. 1 can comprise three display devices. The input device(s) 112 can comprise any appropriate device suitable for enabling a user to input an instruction to the computing device 102, and for enabling a user to interact with what is displayed on the graphical user interface(s) 110. As further shown in FIG. 1, the input device(s) 112 can comprise a keyboard and a mouse.

The first computing device 102 is connected to the second computing device 104 via a first network 114. The second computing device 104 comprises one or more processors 116 and a memory 118. The processor(s) 116 of the second computing device 104 can be any suitable processor capable of executing instructions to process data and perform operations as described herein. By way of example and not limitation, the processor(s) 116 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions. In some examples the second computing device 104 can comprise a remote server or the like.

The memory 118 is an example of non-transitory computer-readable media. The memory 118 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

The memory 118 stores a road network map 120 and a set of rules 122. Although illustrated here separately, the set of rules 122 can be encoded into the road network map 120. The road network map 120 as illustrated in FIG. 1 can be thought of as a master copy of the road network map 120. In other examples, the first computing device 102 can store a local copy of the road network map 120, with any modifications made to the local copy of the road network map 120 being carried through to the master copy of the road network map 120. As indicated above, the road network map 120 can comprise a plurality of elements, such as road segments, connections between road segments, features that interact with road segments, or the like. Relationships between elements, as well as the properties or features of individual elements or groups of elements can be defined by data. The data can be arranged by one or more data structures. For example, each of the elements can be associated with a particular data structure that stores data relating to that element. Relationships between elements can be stored as data in one or more other data structures.

The set of rules 122 can be thought of as a master copy of the set of rules 122. In other examples, the first computing device 102 can store a local copy of the set of rules 122, with any modifications made to the master copy of the set of rules 122 being propagated through to the local copy of the set of rules 122 via one or more software updates or the like. The set of rules 122 can comprise rules relating to elements of the road network map 120, and relationships between elements of the road network map 120, for a given geo-location of the road network map 120. The set of rules 122 can be created and/or maintained manually or automatically, for example by user input or by performing a discovery process where one or more databases are trawled to pull together the set of rules 122. The set of rules 122 can be associated with a particular location, i.e. a bounded region, of the road network map 120. Such an association can be defined based at least in part on coordinates, such as UTM coordinates, of the bounded region of the road network map 120.

The autonomous vehicle 106 is connected to the second computing device 104 via a second network 124. It will be appreciated that, in practice, the first network 114 and the second network 124 may be one and the same, for example with both the first 114 and second 124 networks comprising an internet network or the like.

The autonomous vehicle 106 comprises a navigation system 126, a drive system 128, and one or more communications connection(s) 130.

The navigation system 126 can be configured to determine positional information for controlling the vehicle 106, for example positional information that can be acted upon to cause the drive system 128 to move the vehicle 106. Such positional information can take several forms, and can be derived from several sources. In the example of FIG. 1, the navigation system 126 can comprise a localization component 132, a perception component 134, a planning component 136, a sensor system(s) 138, and a map(s) component 140. It will be appreciated that some components of the navigation system 126, such as the localization component 132, the perception component 134, the planning component 136, and the map(s) component 140 can reside in memory 142 of the vehicle 100.

In at least one example, the localization component 132 can include functionality to receive data from the sensor system(s) 138 to determine a position and/or orientation of the vehicle 106 (e.g., one or more of an x-, y-, z-position, roll, pitch, or yaw). For example, the localization component 132 can include and/or request/receive a map of an environment from the map(s) component 140 and can continuously determine a location and/or orientation of the autonomous vehicle within the map. The map can comprise the road network map 120 obtained by the map(s) component 140 from the second computing device 104. In some instances, the localization component 132 can utilize SLAM (simultaneous localization and mapping), CLAMS (calibration, localization and mapping, simultaneously), relative SLAM, bundle adjustment, non-linear least squares optimization, or the like based on image data, lidar data, radar data, IMU data, GPS data, wheel encoder data, and the like captured by the one or more sensor systems 138 or received from one or more other devices to accurately determine a location of the vehicle 106. In some instances, the localization component 132 can provide data to various components of the vehicle 106 to determine an initial position of the autonomous vehicle 106 for generating a trajectory and/or for determining to retrieve map data.

In at least one example, the sensor system(s) 138 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), image sensors (e.g., camera, RGB, IR, intensity, depth, etc.), audio sensors (e.g., microphones), wheel encoders, environment sensors (e.g., temperature sensors, humidity sensors, light sensors, pressure sensors, etc.), temperature sensors (e.g., for measuring temperatures of vehicle components), etc. The sensor system(s) 138 can include multiple instances of each of these or other types of sensors. For instance, the lidar sensors can include individual lidar sensors located at the corners, front, back, sides, and/or top of the vehicle 106. As another example, the image sensors can include multiple image sensors disposed at various locations about the exterior and/or interior of the vehicle 106. As an even further example, the audio sensors can include multiple audio sensors disposed at various locations about the exterior and/or interior of the vehicle 106. Additionally, the audio sensors can include an array of a plurality of audio sensors for determining directionality of audio data.

In some instances, the perception component 134 can include functionality to perform object tracking, detection, segmentation, and/or classification. In some examples, the perception component 134 can provide processed sensor data that indicates a presence of an entity that is proximate to the vehicle 106 and/or a classification of the entity as an entity type (e.g., car, pedestrian, cyclist, animal, building, tree, road surface, curb, sidewalk, unknown, etc.). In additional and/or alternative examples, the perception component 134 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. In some examples the perception component can provide predictions regarding future positions and/or orientations of detected entities, along with associated certainties. It will be appreciated that at least some of the aforementioned characteristics can be considered positional information as discussed herein.

In general, the planning component 136 can determine a path for the vehicle 106 to follow to traverse through an environment. For example, the planning component 136 can determine various routes and trajectories and various levels of detail. For example, the planning component 136 can determine a route to travel from a first location (e.g., a current location) to a second location (e.g., a target location). For the purpose of this discussion, a route can be a sequence of waypoints for travelling between two locations. As examples, waypoints may include streets, intersections, global positioning system (GPS) coordinates, etc. Further, the planning component 136 can generate an instruction for guiding the vehicle 106 along at least a portion of the route from the first location to the second location. In at least one example, the planning component 136 can determine how to guide the vehicle 106 from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 106 to navigate.

The map(s) component 140 can maintain and/or update one or more maps that can be used by the vehicle 106 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps can include at least one map (e.g., images and/or a mesh). In some examples, the vehicle 106 can be controlled based at least in part on the maps. That is, the maps can be used in connection with the localization component 132, the perception component 134, and/or the planning component 136 to determine a location of the vehicle 106, identify objects in an environment, and/or generate routes and/or trajectories to navigate within an environment. Additionally, the maps can be used in connection with a web-based application to generate content associated with the vehicle 106, such as a data visualization.

In some examples, a map maintained by the map(s) component can comprise the road network map 120, which can be obtained via the map(s) component from the second computing device 104 via the second network 124 using the one or more communications connection(s) 130.

The communications connection(s) 130 can include physical and/or logical interfaces for connecting the vehicle 106 to another computing device (e.g., the second computing device 104) and/or a network, such as the second network 124. For example, communications connection(s) 130 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

The memory 142 of the vehicle 106 can store the localization component 132, the perception component 134, the planning component 136, and the map(s) component 140. Though depicted in FIG. 1 as residing in memory 142 for illustrative purposes, it is contemplated that the localization component 132, perception component 134, planning component 136, and the map(s) component 140, can additionally, or alternatively, be accessible to the vehicle 106 (e.g., stored on, or otherwise accessible from, memory remote from the vehicle 106.

In some examples, one or more of elements, and relationships between elements, of the road network map 120 can be utilised by the planning component 136 when determining a path of the vehicle 106 through an environment. One such relationship between elements of the road network map 120 can comprise a possible drivable area between two road segments. If such a relationship is defined in the road network map 120, then the planning component 136 of the vehicle 106 can consider this relationship when determining a trajectory for the vehicle 106, for example by determining a trajectory according to the relationship.

If no such relationship is defined in the road network map 120, then the planning component 136 of the vehicle 106 can determine that a trajectory according to the missing relationship is not possible, and the planning component 136 can determine a trajectory that does not correspond to the relationship. Additionally or alternatively, the planning component 136 of the vehicle 106 can determine that a trajectory according to the missing relationship is not possible, but can determine from one of more other factors that a trajectory according to the missing relationship is desirable, for example as a result of real-time road closures or to avoid a potential collision or the like. In such circumstances, the planning component 136 can nevertheless determine a trajectory corresponding to the missing relationship from the road network map 120, in spite of the relationship not being defined in the road network map 120. In some examples, the planning component 136 can perform a cost-based analysis, with such an analysis considering whether to determine a trajectory corresponding with a defined relationship between road segments in the road network map 120, or a trajectory not corresponding with a defined relationship between road segments in the road network map 120, based on one or more factors associated with each possible trajectory. Here, for example, the planning component 136 can perform cost-based analysis with safety as a priority, and legality of maneuver as a secondary consideration.

Whilst described above in the context of a physical vehicle 106, the road network map 120 and associated set of rules 122 can be utilised in simulations of the vehicle 106, for example to ensure that simulated vehicles also adhere to the set of rules 122.

As illustrated schematically in FIG. 1, a user 150 can attempt to modify the road network map 120 using the first computing device 102. The first computing device 102 can obtain, over the first network 114 and from the second computing device 104, a local copy of at least a portion of the road network map 120 in response to an instruction from the processor(s) 108. Such an instruction can be initiated in response to an instruction input to the first computing device 102 by the user 150 using the input device(s) 112. Such an instruction can additionally or alternatively be initiated in response to a particular piece of software or application running on the first computing device 102.

The road network map 120, or at least a desired portion of the road network map 120, can be displayed to the user 150 using the graphical user interface(s) 110. Such a portion of the road network map is illustrated by 152 in FIG. 1. The portion 152 of the road network map 120 can comprise a first road segment 154 having four lanes 156,158,160,162, with two lanes either side of a central divider 163. The portion 152 of the road network map 120 can comprise a second road segment 164 having four lanes 166,168,170,172, with two lanes either side of a central divider 173. The portion 152 of the road network map 120 can be associated with a particular real world geo-location, say, for example, a geo-location within California. Where the portion 152 of the road network map 120 is to be utilised for a vehicle simulation, the portion of the road network map 120 can be associated with a particular location of a simulated environment, which can correspond to a real world geo-location. Such a geo-location can be considered to comprise a bounded area of the road network map 120.

The user 150 may wish to modify the portion 152 of the road network map 120 to create a possible turn, i.e. a possible drivable area for the vehicle 106 within the portion 152 of the road network map 120. A request to modify the portion 152 of the road network map 120 can be received from the user 150 via user input device(s) 112, and where the user input device(s) 112 comprise a keyboard and mouse, one example input can include clicking and dragging of a mouse to attempt to create a connection between lanes present in the portion 152 of the road network map 120. Such a connection can be visually represented to the user by the graphical user interface(s) 110.

Figure 2:
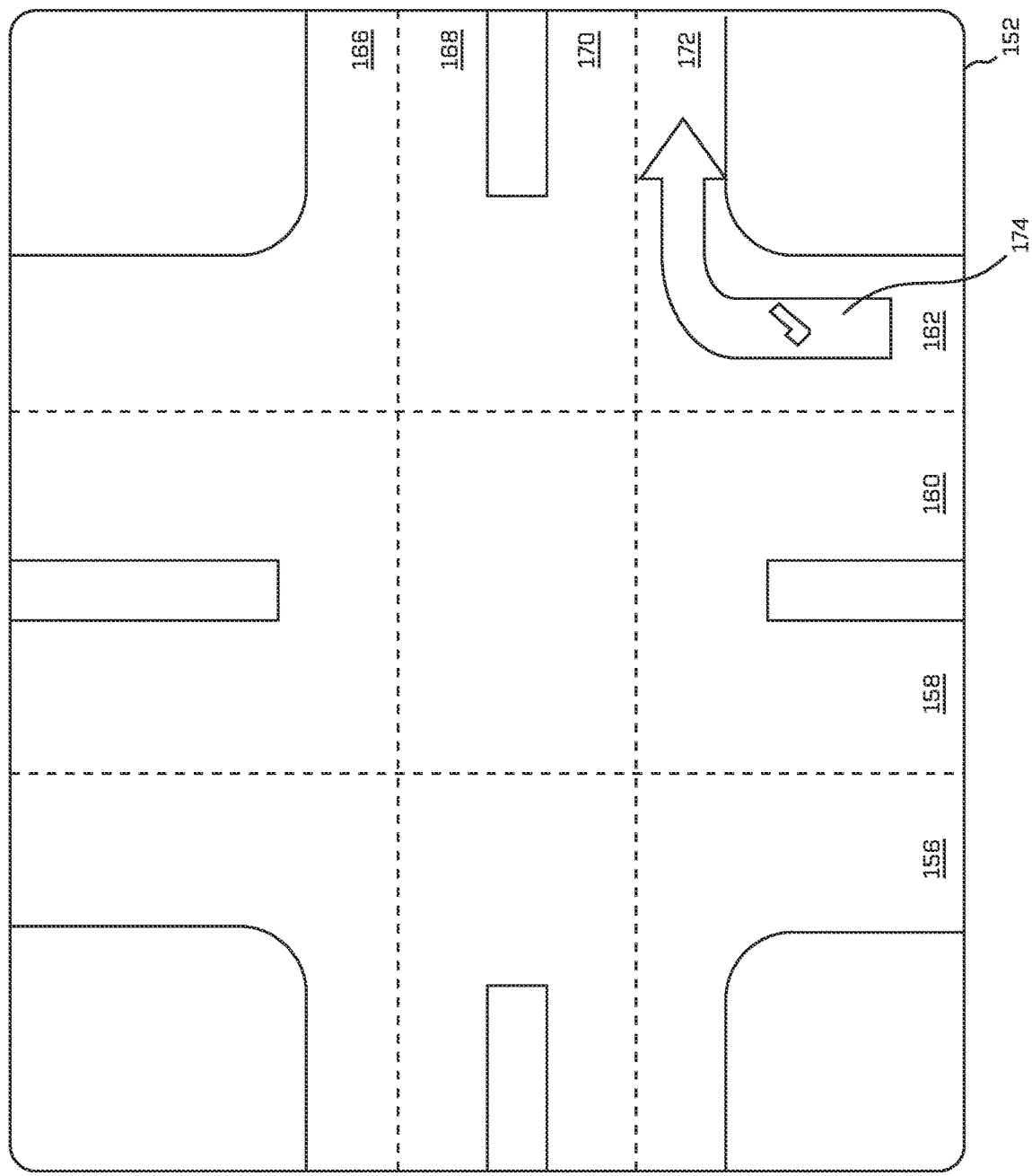
FIG. 2 is a schematic illustration of a valid modification request to a road network map.

A first possible turn 174 desired to be added to the portion 152 of the road network map 120 by the user 150 can be a turn from the right-most lane 162 of the first road segment 154 to the right-most lane 172 of the second road segment 164, as illustrated schematically in FIG. 2. To attempt to input such a first possible turn 174, a user can click with a mouse on a region of the graphical user interface(s) 110 corresponding to the right-most lane 162 of the first road segment 154, drag the mouse to a region of the graphical user interface(s) 110 corresponding to the right-most lane 172 of the second road segment 164, and release the mouse click. It will be appreciated that other types of input can be performed by the user 150. For example, rather than dragging the house with the button clicked or depressed, the user 150 can simply click the mouse on the relevant regions of the graphical user interface(s) 110 to attempt to input the first possible turn 174. Alternatively, a user can attempt to input the first possible turn 174 by using the keyboard to write in one or more programming languages to attempt to modify the portion 152 of the road network map 120.

In response to such a user input, the processor(s) 108 of the first computing device 104 can compare the first possible turn 174 to the set of rules 122, which can be obtained from the second computing device 104 over the first network 114. It will be appreciated that, in practice, such comparison can also take place at the second computing device 104, with a result of the comparison transmitted to the first computing device 102 over the first network 114. It will further be appreciated that the first computing device 102 can store a local copy of the set of rules 122, which may reduce latency in comparison compared to an arrangement where the first computing device 102 is required to obtain the set of rules 122 from the second computing device 104 each time a comparison is to be made.

The set of rules 122 can correspond to traffic laws for the given location of the portion 152 of the road network map 120, in this case the traffic laws of California. By comparing the first possible turn 174 to the set of rules 122, the first computing device 102 can determine whether the first possible turn 174 complies with the set of rules 122, and hence whether the first possible turn 174 is a valid modification for the user 150 to make to the portion 152 of the road network map 120. In the case of California, for example, the first possible turn 174 can be considered to comply with Californian traffic laws. Where the first possible turn 174 complies with the set of rules 122, and where the first possible turn 174 is determined to be a valid modification for the user 150 to make to the portion 152 of the road network map 120, the first computing device 102 allows the first possible turn 174 to be added to the road network map 120.

Such a valid addition to the portion 152 of the road network map 120 is illustrated schematically in FIG. 2 by a visual representation of the first possible turn 174 accompanied by a "tick". It will be appreciated that other forms of visual representation may be utilised to indicate to the user 150 that their modification request is valid. For example, a visual representation of a particular shape, boundary, or colour, can be used to indicate a valid modification, as can text such as a pop-up box or the like on the graphical user interface(s) 110. Other indications of valid modification requests are also envisaged. For example, the first computing device 102 can output an audible signal to indicate that a valid modification request has been received and/or made.

Where the road network map 120 is successfully modified by the user 150, changes can be propagated back to the version of the road network map 120 stored on the second computing device 104, which can be considered to be a master version of the road network map 120.

Figure 3:
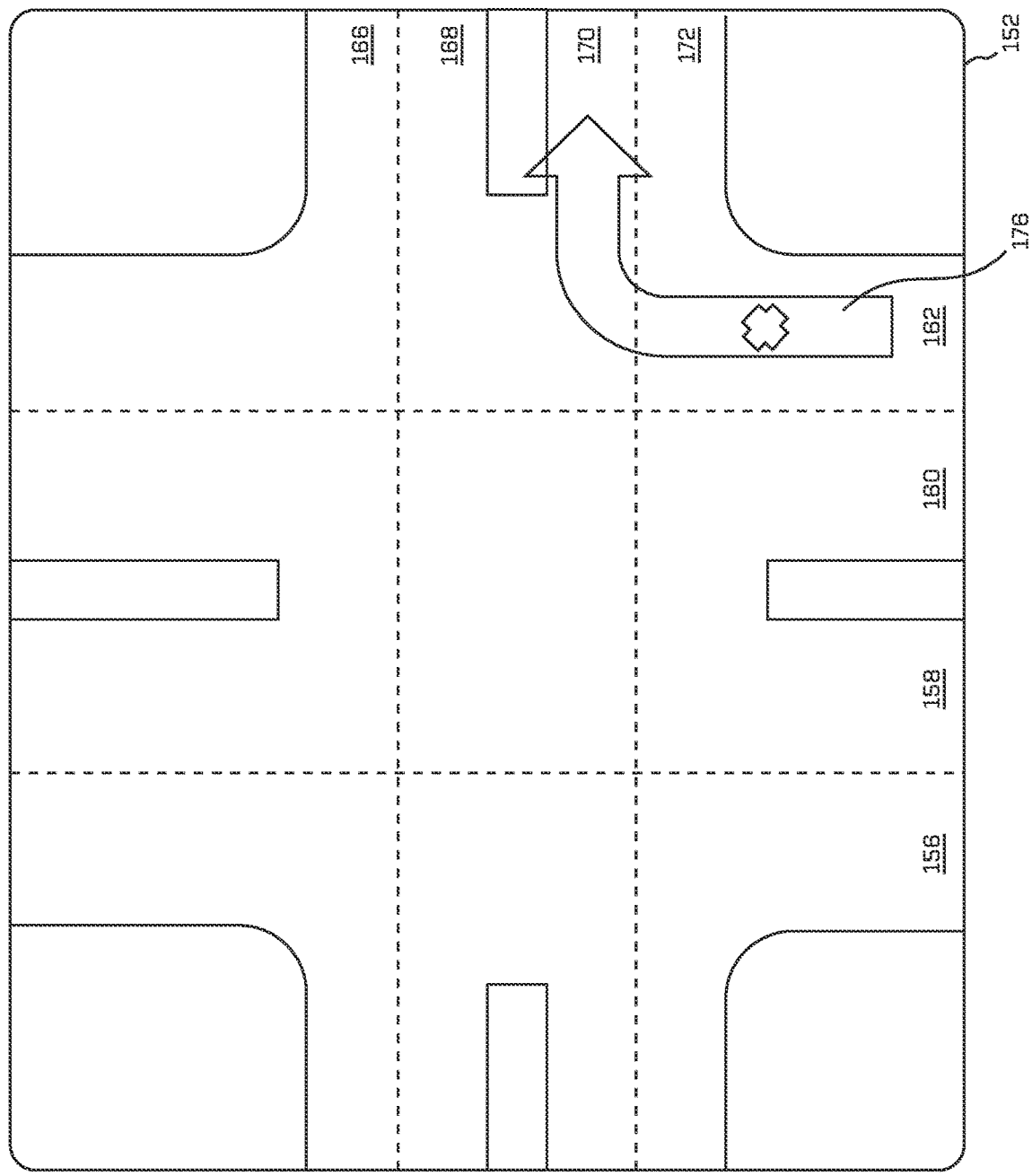
FIG. 3 is a first schematic illustration of an invalid modification request to a road network map.

A second possible turn 176 desired to be added to the portion 152 of the road network map 120 by the user 150 can be a turn from the right-most lane 162 of the first road segment 154 to the inner-right lane 170 of the second road segment 164 (corresponding to a left lane in the context of a vehicle 106 travelling along the second road segment 164 from left to right), as illustrated schematically in FIG. 3. To attempt to input such a second possible turn 176, a user can attempt to utilise the input device(s) 112 alongside the graphical user interface(s) in the manner described above in reference to FIG. 2.

In response to such a user input, the processor(s) 108 of the first computing device 104 can compare the second possible turn 176 to the set of rules 122, which can be obtained from the second computing device 104 over the first network 114. It will be appreciated that, in practice, such comparison can also take place at the second computing device 104, with a result of the comparison transmitted to the first computing device 102 over the first network 114. It will further be appreciated that the first computing device 102 can store a local copy of the set of rules 122, which may reduce latency in comparison compared to an arrangement where the first computing device 102 is required to obtain the set of rules 122 from the second computing device 104 each time a comparison is to be made.

As above, the set of rules 122 can correspond to traffic laws for the given location of the portion 152 of the road network map 120, in this case the traffic laws of California. By comparing the second possible turn 176 to the set of rules 122, the first computing device 102 can determine whether the second possible turn 176 complies with the set of rules 122, and hence whether the second possible turn 176 is a valid modification for the user 150 to make to the portion 152 of the road network map 120. In the case of California, for example, the second possible turn 174 can be considered not to comply with Californian traffic laws, where right turns must take place from right-most lane to right-most lane. Where the second possible turn 176 does not comply with the set of rules 122, and where the second possible turn 176 is determined to be an invalid modification for the user 150 to make to the portion 152 of the road network map 120, the first computing device 102 does not allow the second possible turn 176 to be added to the road network map 120.

Where the second possible turn 176 is determined to be an invalid modification for the user 150 to make to the portion 152 of the road network map 120, the first computing device 102 may inhibit data encoding the second possible turn 176 from being added to the road network map 120, for example by inhibiting data encoding the second possible turn 176 from being added to one or more data structures of the road network map 120. In such a scenario, the road network map 120 can comprise only those relationships determined to be valid in accordance with the set of rules 122. The vehicle 106, for example the planning component 136, can operate in the manner described previously utilising the road network map 120 and those relationships encoded therein, or indeed missing therefrom.

Additionally or alternatively, where the second possible turn 176 is determined to be an invalid modification for the user 150 to make to the portion 152 of the road network map 120, the first computing device 102 may inhibit data encoding the second possible turn 176 from being added to the road network map 120, for example by inhibiting data encoding the second possible turn 176 from being added to one or more data structures of the road network map 120, and may add data encoding the invalid nature of the second possible turn 176 to the road network map. In such a scenario, the road network map 120 can comprise those relationships determined to be valid in accordance with the set of rules 122, and those relationships determined to be invalid in accordance with the set of rules 122. The vehicle 106, for example the planning component 136, can operate in the manner described previously utilising the road network map 120 and those relationships encoded therein, or indeed missing therefrom.

Figure 4:
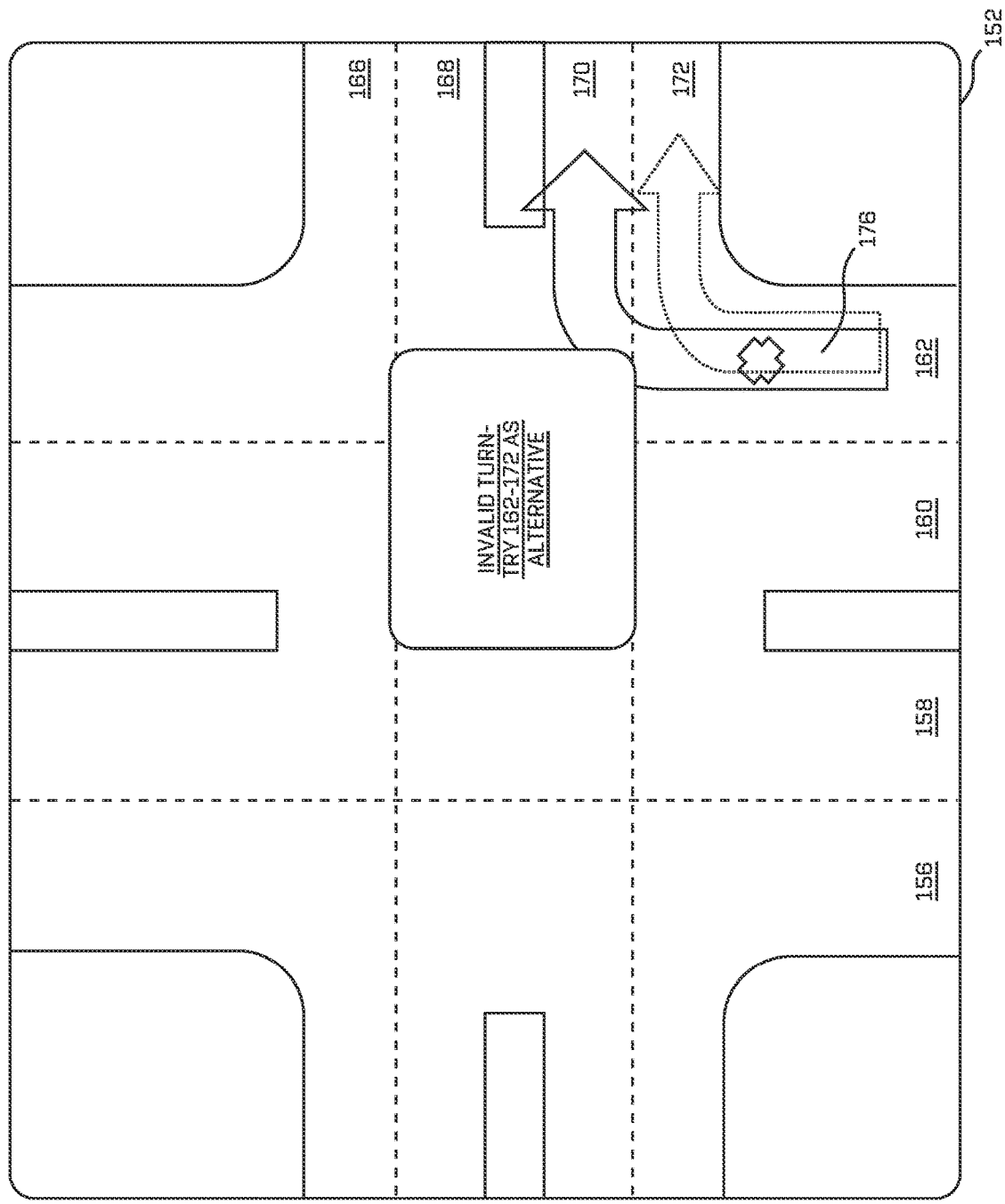
FIG. 4 is a second schematic illustration of an invalid modification request to a road network map.

Such an invalid addition to the portion 152 of the road network map 120 is illustrated schematically in FIG. 3 by a visual representation of the second possible turn 176 accompanied by a "cross". It will be appreciated that other forms of visual representation may be utilised to indicate to the user 150 that their modification request is invalid. For example, a visual representation of a particular shape, boundary, or colour, can be used to indicate an invalid modification, as can text such as a pop-up box or the like on the graphical user interface(s) 110. Other indications of invalid modification requests are also envisaged. For example, the first computing device 102 can output an audible signal to indicate that an invalid modification request has been received and/or made.

Where an invalid modification is requested, an additional or alternative indication of a proposed valid modification can be provided to the user, for example using the graphical user interface(s). As shown in FIG. 4, such a proposed alternative valid modification can be indicated to the user 150 using a pop-up dialog box or the like, directing the user toward a valid modification, such as directing the user 150 toward addition of the first possible turn 174 instead of the second possible turn 176. Additionally or alternatively to a pop-up dialog box, a visual indicator can be used, as shown schematically in FIG. 4, to propose an alternative valid modification. Such a visual indicator can include, in the example of the first 174 and second 176 turns discussed previously, an indicator representative of a valid, i.e. the first 174, turn in the form of any of a dashed trajectory, and a different colored trajectory, to that of an invalid, i.e. the second 176, turn, with a dashed trajectory shown in FIG. 4.

In some examples, the first computing device 102 can automatically make a valid modification where an invalid modification request is determined. For example, rather than allowing an invalid modification request, the first computing device 102 can instead automatically make a valid modification deemed to achieve a substantially similar purpose to that of the modification request.

The above has been described in relation to a modification request. In some examples, a request input by the user 150 can comprise a request to validate the portion 152 of the road network map 120 based on the set of rules 122. Similar processes to those above may then be performed, for example with existing possible turns defined in the road network map 120 being compared to the set of rules 122. Where valid or invalid possible turns are identified as part of the validation process, indications can be provided to the user 150 in a similar manner to the indications described above.

Figure 5:
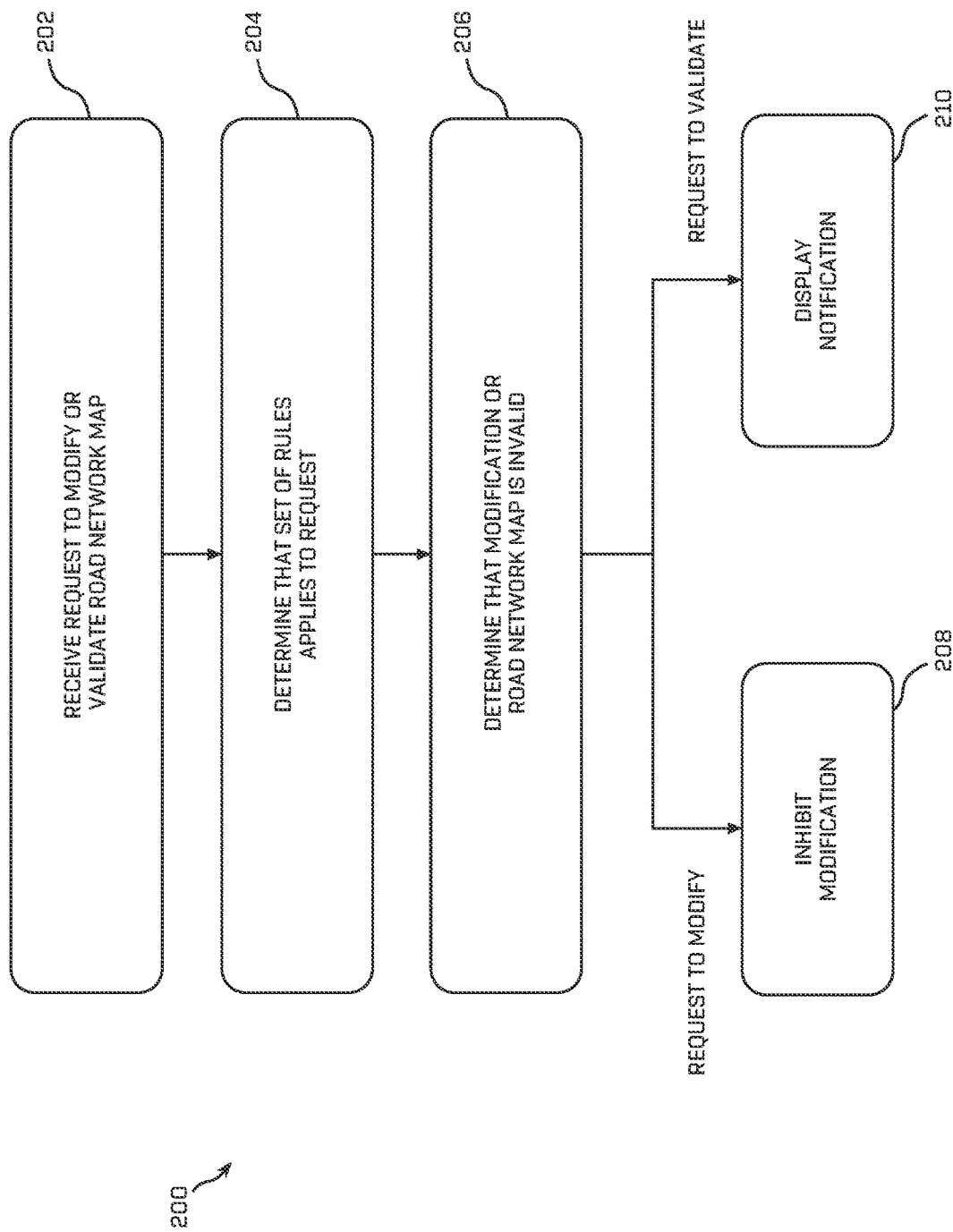
FIG. 5 is a flow diagram illustrating a method determining whether a modification request to a road network map is valid or invalid.

A method 200 in accordance with the above is illustrated schematically in FIG. 5. The method 200 comprises receiving 202, at one or more processors, a request to modify or validate a road network map. The method 200 comprises determining 204, using the one or more processors and based at least in part on the location being within a bounded area of the road network map 120, that a set of rules applies to the request, the set of rules associated with the bounded area of the road network map 120. The method 200 comprises determining 206, using the one or more processors and based at least in part on the set of rules, that the requested modification or the road network map 120 is invalid. The method 200 comprises, based at least in part on the requested modification or the road network map being invalid, inhibiting 208, using the one or more processors, modification of the road network map 120 according to the request to modify the road network map, or displaying 210 a notification to a user making the request to validate the road network map that the road network map 120 violates the set of rules.

The comparison between the requested modification by the user 150 or the existing road network map 120 and the set of rules 122 can be performed in any appropriate manner. For example, and as discussed above, relationships between elements, as well as the properties or features of individual elements or groups of elements can be defined by data. The data can be arranged by one or more data structures. For example, each of the elements can be associated with a particular data structure that stores data relating to that element. Relationships between elements can be stored as data in one or more other data structures. A request to modify the road network map 120 can involve a request to modify or add data to one or more data structures associated with an element of the road network map 120. Such proposed modified or new data for the data structure can be compared to data associated with the set of rules 122, for example data stored in one or more databases, to check for compliance with the set of rules 122. Similarly, a request to validate the road network map 120 can comprise a request to validate existing data in one or more data structures associated with an element of the road network map 120. Such existing data can be compared to data associated with the set of rules 122, for example data stored in one or more databases, to check for compliance with the set of rules 122. The data used to define such relationships can comprise any of semantic and absolute data.

In the context of the first 174 and second 176 possible turns discussed above, the four lanes 156,158,160,162, of the first road segment 154 can be semantically labelled as either "right" or "left" lanes for their particular direction of travel, and similarly the four lanes 166,168,170,172 of the second road segment 164 can be semantically labelled as either "right" or "left" lanes for their particular direction of travel, with such semantic labelling stored in corresponding data structures. This is illustrated schematically in FIG. 6.

Where it is desired to modify the portion 152 of the road network map 120 to add the first possible turn 174, the first possible turn 174 may be treated as a relationship between the right-most lane 162 of the first road segment 154 and the right-most lane 172 of the second road segment 164, with semantic data of this relationship being desired to be stored in an appropriate data structure. For example, the relationship may be defined by a semantic label such as "right lane to right lane".

Figure 6:
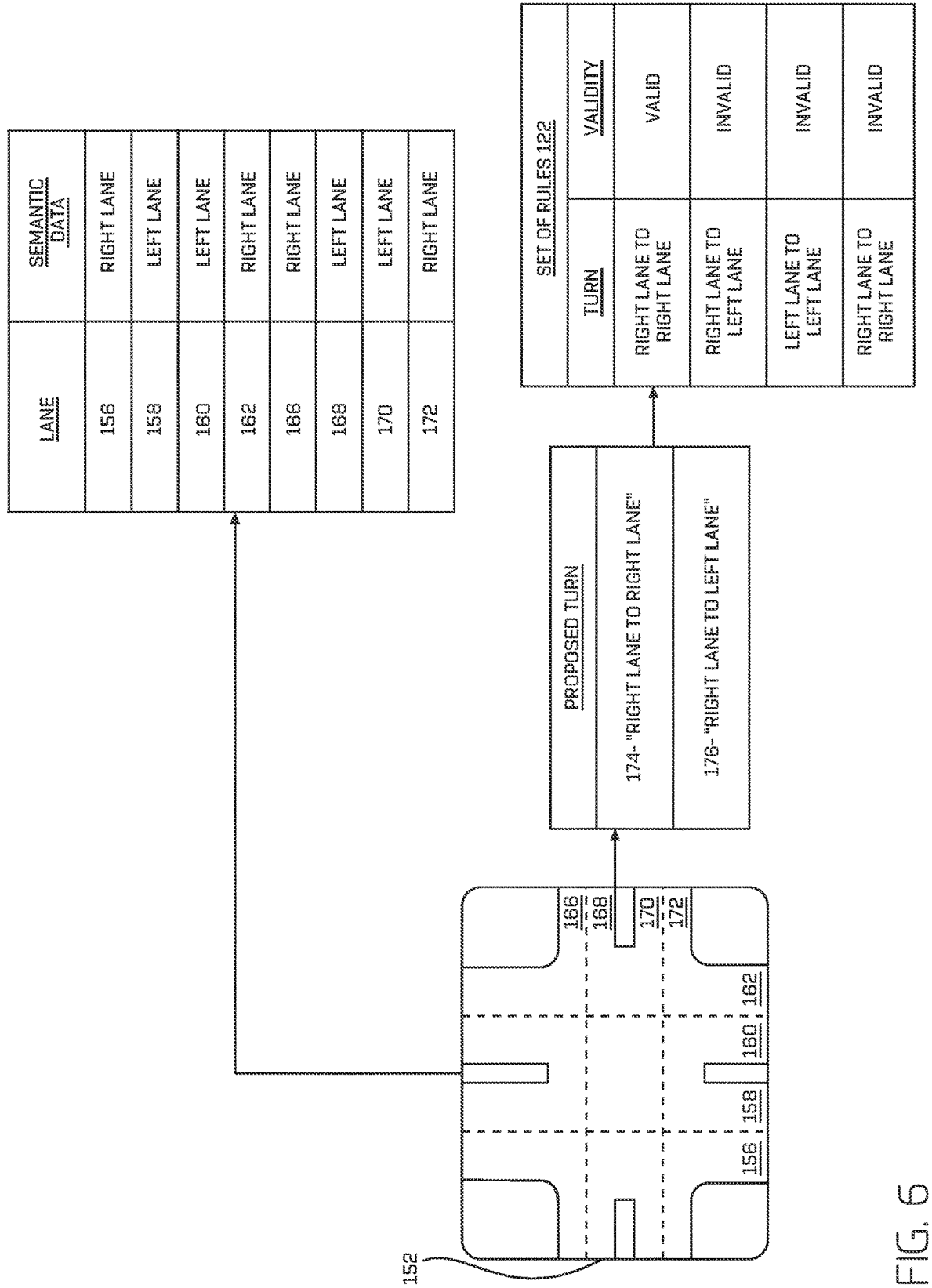
FIG. 6 is a schematic illustration of a comparison of semantic data of elements of a road network map.

Before storing the relationship in an appropriate data structure, the processor(s) 108 of the first computing device 102 can compare the semantic labelling of the relationship, e.g. "right lane to right lane", to the set of rules 122. The set of rules 122 can comprise a look-up table of semantic labels of relationships between elements of the road network map, and a corresponding indicator as to whether such a relationship is considered valid or invalid for a particular location or bounded area given local traffic laws. As illustrated in FIG. 6, for the first possible turn 174 the set of rules 122 can associate a "right lane to right lane" turn as valid, given that such a turn is legally permissible in California. Thus, given that the first possible turn 174 is determined to comply with the set of rules 122, and hence is determined to be valid, the processor(s) 108 of the first computing device 102 an allow the relationship for the first possible turn 174 to be stored in an appropriate data structure to link the right-most lane 162 of the first road segment 154 and the right-most lane 172 of the second road segment 164. An appropriate indication can be provided to the user 150 of the valid modification request, as discussed previously.

Similarly, where it is desired to modify the portion 152 of the road network map 120 to add the second possible turn 176, the second possible turn 176 may be treated as a relationship between the right-most lane 162 of the first road segment 154 and the inner-right lane 170 of the second road segment 164 (corresponding to a left lane in the context of a vehicle 106 travelling along the second road segment 164 from left to right), with semantic data of this relationship being desired to be stored in an appropriate data structure. For example, the relationship may be defined by a semantic label such as "right lane to left lane".

Before storing the relationship in an appropriate data structure, the processor(s) 108 of the first computing device 102 can compare the semantic labelling of the relationship, e.g. "right lane to left lane", to the set of rules 122. The set of rules 122 can comprise a look-up table of semantic labels of relationships between elements of the road network map, and a corresponding indicator as to whether such a relationship is considered valid or invalid for a particular location given local traffic laws. As illustrated in FIG. 6, for the second possible turn 176 the set of rules 122 can associate a "right lane to left lane" turn as invalid, given that such a turn is legally impermissible in California. Thus, given that the second possible turn 176 is determined not to comply with the set of rules 122, and hence is determined to be invalid, the processor(s) 108 of the first computing device 102 may not allow the relationship for the second possible turn 174 to be stored in an appropriate data structure to link the right-most lane 162 of the first road segment 154 and the inner-right lane 170 of the second road segment 164, and additionally or alternatively may instead store data indicating that such a relationship is not permissible. An appropriate indication can be provided to the user 150 of the invalid modification request, as discussed previously.

Other forms of comparison are also envisaged additionally or alternatively to such semantic labelling. In some examples, a geometry of a possible vehicle trajectory or turn or possible drivable area can be compared to the set of rules 122 to determine whether such a possible trajectory or turn or possible drivable area complies with the set of rules 122.

For example, where it is desired to modify the portion 152 of the road network map 120 to add the first possible turn 174, the first possible turn 174 may comprise a first turn geometry, for example comprising a first curvature C1. In contrast, where it is desired to modify the portion 152 of the road network map 120 to add the second possible turn 176, the second possible turn 176 may comprise a second turn geometry, for example comprising a second curvature C2. The second geometry, and hence the second curvature C2, may be different to the first geometry, and hence the first curvature C1, given the differences in trajectories required to move between the different lanes for the first 174 and second 176 possible turns. This is illustrated schematically in FIG. 7. The set of rules 122 can comprise a list of turn geometries, for example a list of curvatures, and an associated indicator as to whether such a geometry, or curvature, is valid or invalid for a particular geolocation. For example, a transition from the right-most lane 162 of the first road segment 154 and the right-most lane 172 of the second road segment 164, i.e. the first possible turn 174, may require a trajectory or drivable area having greater curvature than a trajectory or drivable area required for a transition from the right-most lane 162 of the first road segment 154 to the inner-right lane 170 of the second road segment 164, i.e. the second possible turn 176. The set of rules 122 can thereby use such geometries to distinguish between those turns that are deemed valid or invalid.

Accordingly, the processor(s) 108 of the first computing device can determine, either through calculation or through a look-up table or the like, a geometry of a turn depending on the desired turn that is input by the user 150. Such a determined geometry can be compared to the set of rules 122 to determine whether the determined geometry complies with the set of rules 122 for the given location, and hence whether the desired turn is valid or invalid.

Figure 7:
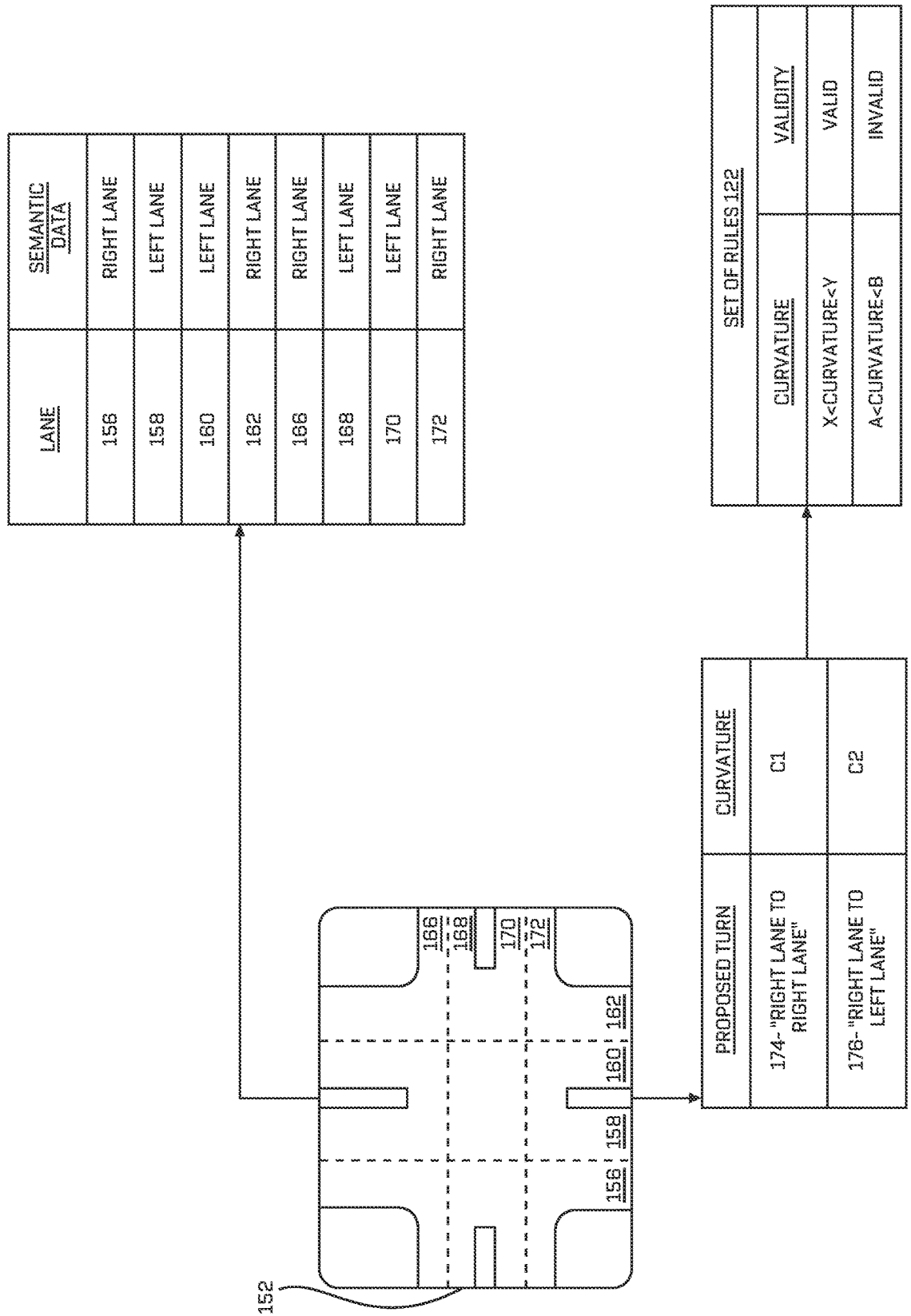
FIG. 7 is a schematic illustration of a comparison of turn geometries of turns associated with a road network map.

Instead of absolute values, the set of rules 122 can store threshold values for the particular geometries, with such threshold values illustrated schematically in FIG. 7. Here, if the curvature C1,C2 of a desired turn lies between X and Y, the desired turn can be determined to be valid, whereas if the curvature C1,C2 of a desired turn lies between A and B, where A and B define a non-overlapping range with X and Y, the desired turn can be determined to be invalid. Such threshold values can be appropriately chosen for a given bounded area, and greater granularity can be provided, if so desired, for example where greater than two possible turns are possible.

The examples above have focused on modification requests to define possible transitions/trajectories/turns/drivable areas from one road segment to another. Other modification requests to define elements/relationships of the road network map 120 are also envisaged for comparison to the set of location based rules 122.

Figure 8:
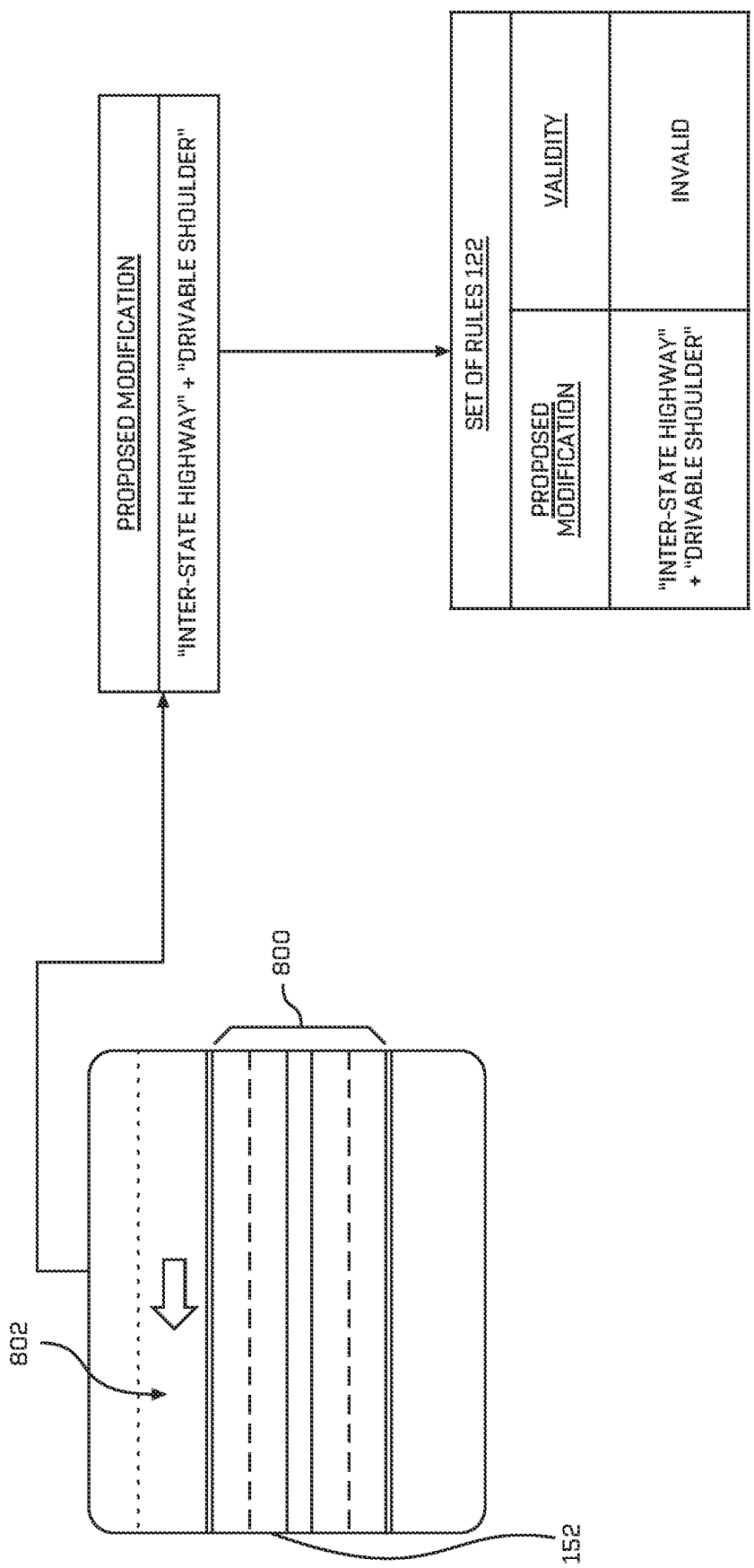
FIG. 8 is a schematic illustration of a modification request to add a drivable area along a shoulder to a road network map.

In some examples, an element of the road network map 120 can comprise a road segment and a modification request can comprise a request to add a possible drivable area relative to the element of the road network map 120. For example, a modification request can be received to add a possible drivable area along a shoulder relative to a road segment. Such a scenario is illustrated schematically in FIG. 8, with a road segment 800 and a shoulder 802 adjacent to the road segment 800, and the shoulder 802 indicated by a dotted line. Here, a road attribute associated with the road segment 800 can be stored in an appropriate data structure, and the road attribute can comprise, for example, a road type associated with the road segment 800. For example, in FIG. 8 the road segment 800 can comprise a particular type of highway, e.g. interstate highway, state highway, private toll road, etc, with an indication as to the particular type of highway stored in an appropriate data structure. This can take the form of appropriate semantic labelling, as discussed above. Where the user 150 attempts to add a possible drivable area along the shoulder 802, indicated by an arrow in FIG. 8, a semantic label associated with the shoulder 802 can be combined with that associated with the road segment 800 and the desired possible drivable area, with such a combined semantic label compared to the set of rules 122 to determine whether or not the combination of the road segment 800 and the possible drivable area along the shoulder 802 complies with traffic laws for the given location. In the example of FIG. 8, a combination of "inter-state highway" and "drivable shoulder" may be deemed not to comply with the set of rules 122, and hence the modification request can be deemed invalid, with the desired relationship between the road segment 800 and the possible drivable area along the shoulder 802 not being stored in an appropriate data structure, and an appropriate indication being provided to a user.

Figure 9:
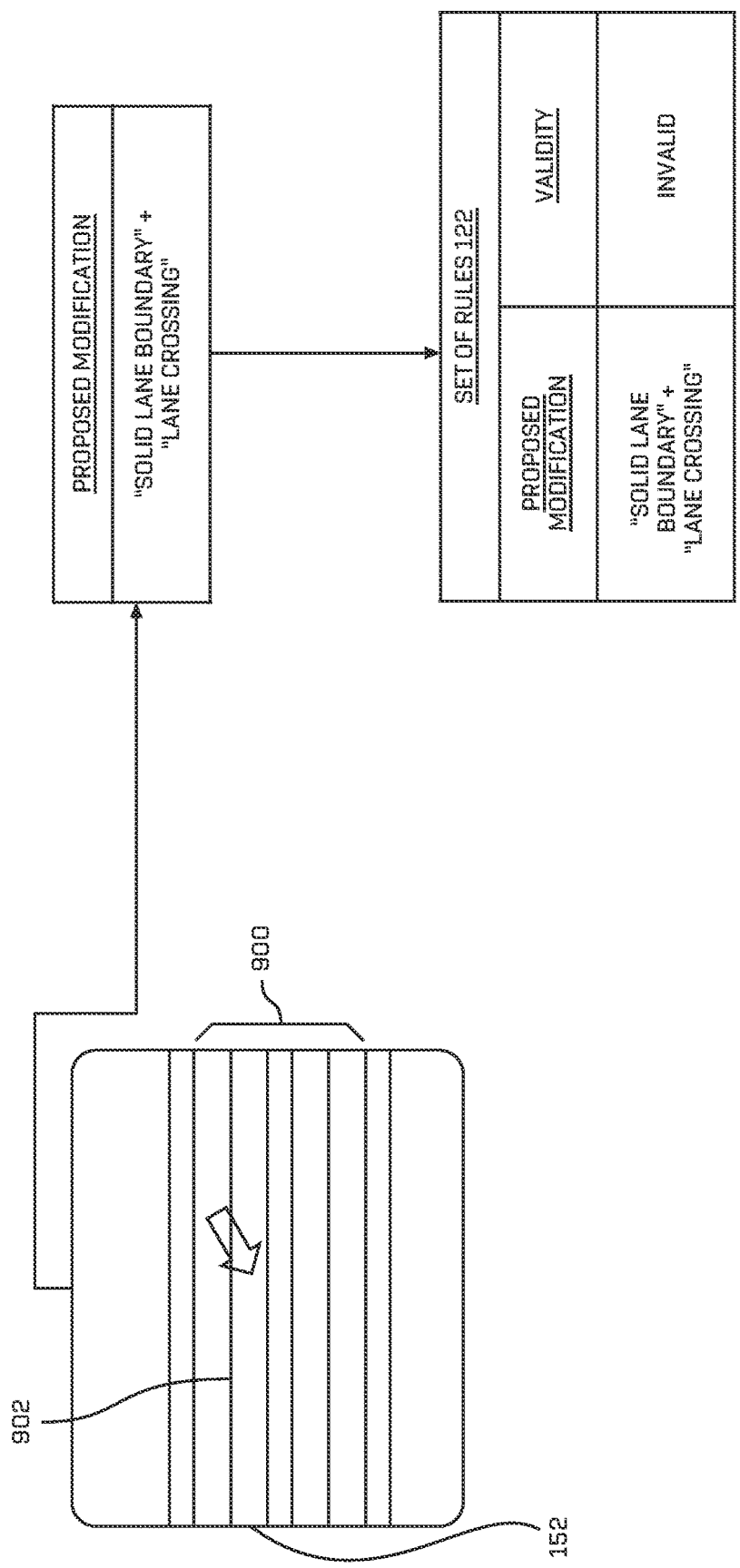
FIG. 9 is a schematic illustration of a modification request to add a possible lane change to a road network map.

Another example of a road attribute or feature can comprise a lane marking associated with a particular road segment. For example, as illustrated in FIG. 9 a road segment 900 can comprise a solid lane boundary 902, with the road segment 900 comprising four lanes separate by a central reservation. A request to modify the portion 152 of the road network map 120 can comprise a request to add or modify a possible vehicle trajectory that crosses the solid lane boundary 902, with the request indicated schematically by an arrow in FIG. 9. Here a semantic label associated with the road segment can comprise "solid lane boundary", whilst a semantic label associated with the desired trajectory can comprise "lane crossing". A combination of the semantic labels, e.g. "solid lane boundary+lane crossing" can be compared to the set of rules 122 to determine if such a desired trajectory is valid or invalid for a given location. In the example of FIG. 9, the portion 152 of the road network map 120 is associated with the location of California, where crossing a solid lane boundary is legally permissible, and so the request is determined to be valid. Different states/territories can comprise different traffic laws, and so in other locations the request can be determined to be invalid.

As above, an example of a road attribute or feature can comprise a lane marking associated with a particular road segment. A request to modify the portion of the road network map 152 can comprise a request to add or modify a relationship associated with a particular lane marking, for example such that a meaning of the lane marking is changed. Such a request can be compared to the set of rules in a similar manner to that described previously to determine if the requested change in relationship for the road marking is valid for a given location.

Another example of a road attribute or feature can comprise a so-called "keep-out" zone associated with a particular road segment. For example, road segments outside particular building structures, such as schools, fire houses, hospitals and the like, can comprise keep-out zones which are intended to be no-stopping zones for vehicles, such that access to the relevant building structures is not impeded. A request to modify the portion 152 of the road network map 120 can comprise a request to add a possible stopping zone to a road segment that coincides with a keep-out zone already defined on that portion of the road segment. Such a request can be compared with the set of rules 122 to determine whether the request is invalid. A request to modify the portion 152 of the road network map 120 can comprise a request to add a road segment without a keep-out zone adjacent to a particular building type, such as a school, fire house, or hospital. Such a request can be compared with the set of rules 122 to determine whether the request is invalid. Similarly, a request to validate the portion 152 of the road network map 120 can comprise a request to validate a road segment for which no keep-out zone is defined adjacent to a particular building type, such as a school, fire house, or hospital. The portion 152 of the road network map 120 can be compared with the set of rules 122 to determine whether the portion 152 is invalid.

Another example of a road attribute or feature can comprise a speed limit associated with a road segment. For example, particular types of roads may be designated as having particular speed limits for a given location. A request to modify the portion 152 of the road network map 120 can comprise a request to associate a particular speed limit with a particular road segment. Semantic labels associated with the requested speed limit and the particular type of the road segment can be combined and compared to the set of rules in a similar manner to that described previously to determine if the requested speed limit for the particular road type is valid for a given location.

In some examples, a road attribute or feature can comprise a lane designation for a particular type of vehicle or bicycle for a given road segment, and a request to modify the portion 152 of the road network map can comprise a request to add a possible drivable area for the vehicle 106 that at least partially coincides with the road segment having the given lane designation. For example, in some locations lane sharing between cars and motorcycles, lane sharing between cars and light rail vehicles, and lane sharing between cars and busses, may be deemed illegal. Semantic labels associated with the requested possible drivable area and the lane designation of the road segment can be combined and compared to the set of rules in a similar manner to that described previously to determine if the requested possible drivable area for the given lane designation is valid for a given location.

Another example of a road attribute or feature can comprise a traversable side associated with a particular road segment. For example, different countries can comprise differing laws with regard to which side of a road a vehicle is permitted to be driven on. A request to modify the portion 152 of the road network map 120 can comprise a request to add a possible drivable area to a particular side of a road segment for a given location. Semantic labels associated with the possible drivable area, for example "drive on left-side", and the road segment can be combined and compared to the set of rules in a similar manner to that described previously to determine if the requested possible drivable area for the given side of the road segment is valid for a given location.

In some examples, a first element of the road network map 120 can comprise a road segment, a second element of the road network map 122 can comprise a traffic control element, such as a traffic light or a cross-walk, associated with the road segment. In such examples, a data structure can store data representative of one or more operational conditions associated with the traffic control element, as well as corresponding possible vehicle trajectories or possible drivable areas, or corresponding vehicle operating conditions. For example, where the traffic control element comprises a traffic light, one or more data structures can store data representative of red light, yellow light, and green light, and one or more data structures can store a possible vehicle trajectory, or possible drivable area, or vehicle operating condition associated with the red light, yellow light, or green light. A request to modify the region 152 of the road network map 120 can comprise a request to add or modify a possible vehicle trajectory, or possible drivable area, or possible vehicle operating condition associated with the operational condition of the traffic control element.

Figure 10:
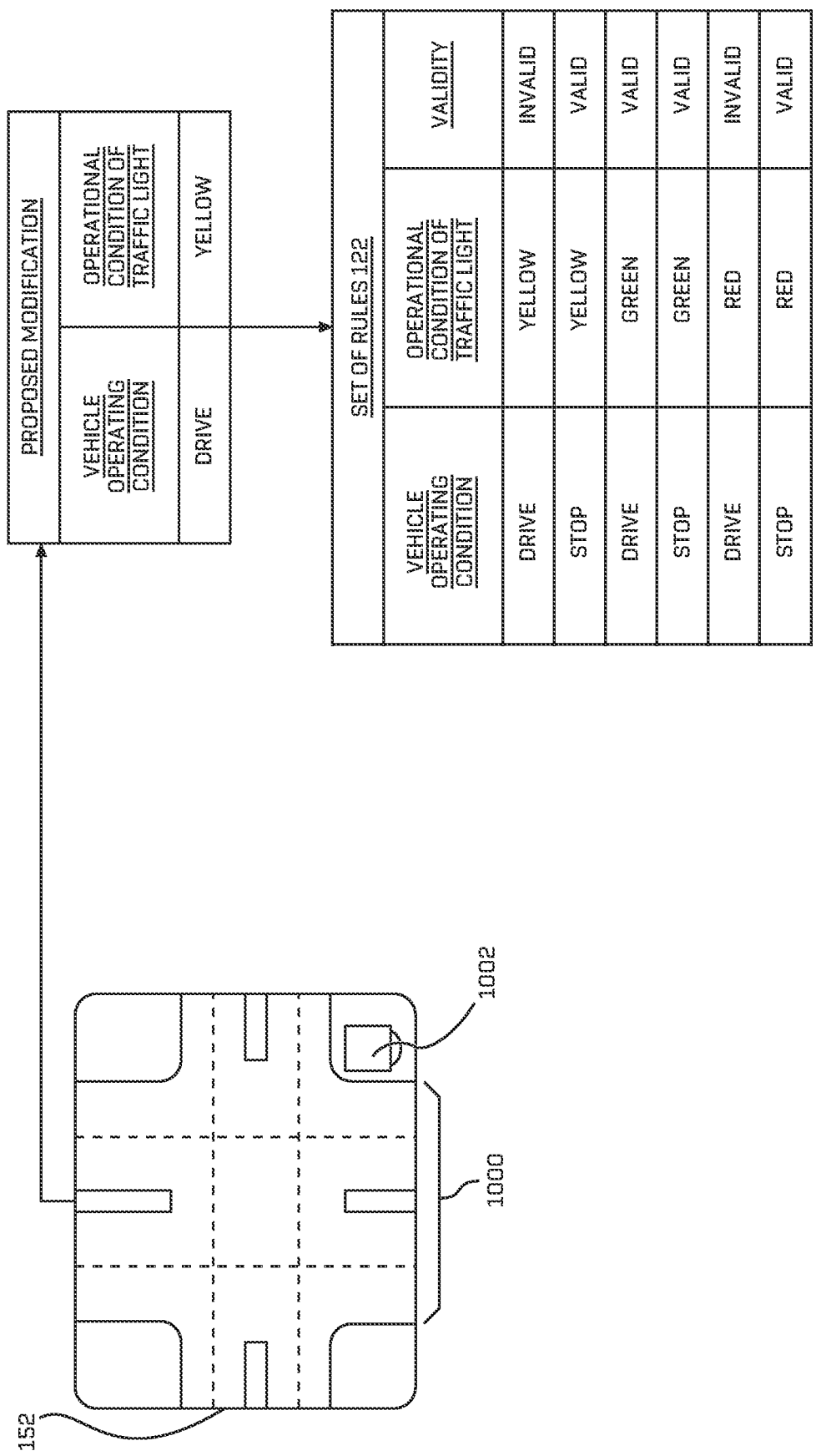
FIG. 10 is a schematic illustration of a modification request to add a relationship between a vehicle and a traffic light to a road network map.

In the example of FIG. 10, the portion 152 of the road network map 120 can comprise a road segment 1000 and a traffic light 1002. A request to modify the portion 152 of the road network map 120 can comprise a request to add a vehicle operating condition with respect to a corresponding operational condition of the traffic light 1002. For example, the request to modify the portion 152 of the road network map 120 can comprise a request to associate a "drive" vehicle operating condition with a "yellow light" operational condition of the traffic light 1002. However, in some locations such an association can be considered to be invalid. The processor(s) 108 of the first computing device 102 can operate in the same manner described previously to compare the request to the set of rules 122 for the given location, to determine whether the request is valid or invalid.

In some examples, a request to modify the portion 152 of the road network map 120 can comprise a request to add a possible drivable area for the vehicle 106 with respect to a corresponding operational condition of the traffic light 1002. For example, the request to modify the portion 152 of the road network map 120 can comprise a request to associate a possible right turn of the vehicle 106 with a "red light blinking" operational condition of the traffic light 1002. However, in some locations such an association can be considered to be invalid. The processor(s) 108 of the first computing device 102 can operate in the same manner described previously to compare the request to the set of rules 122 for the given location, to determine whether the request is valid or invalid.

Figure 11:
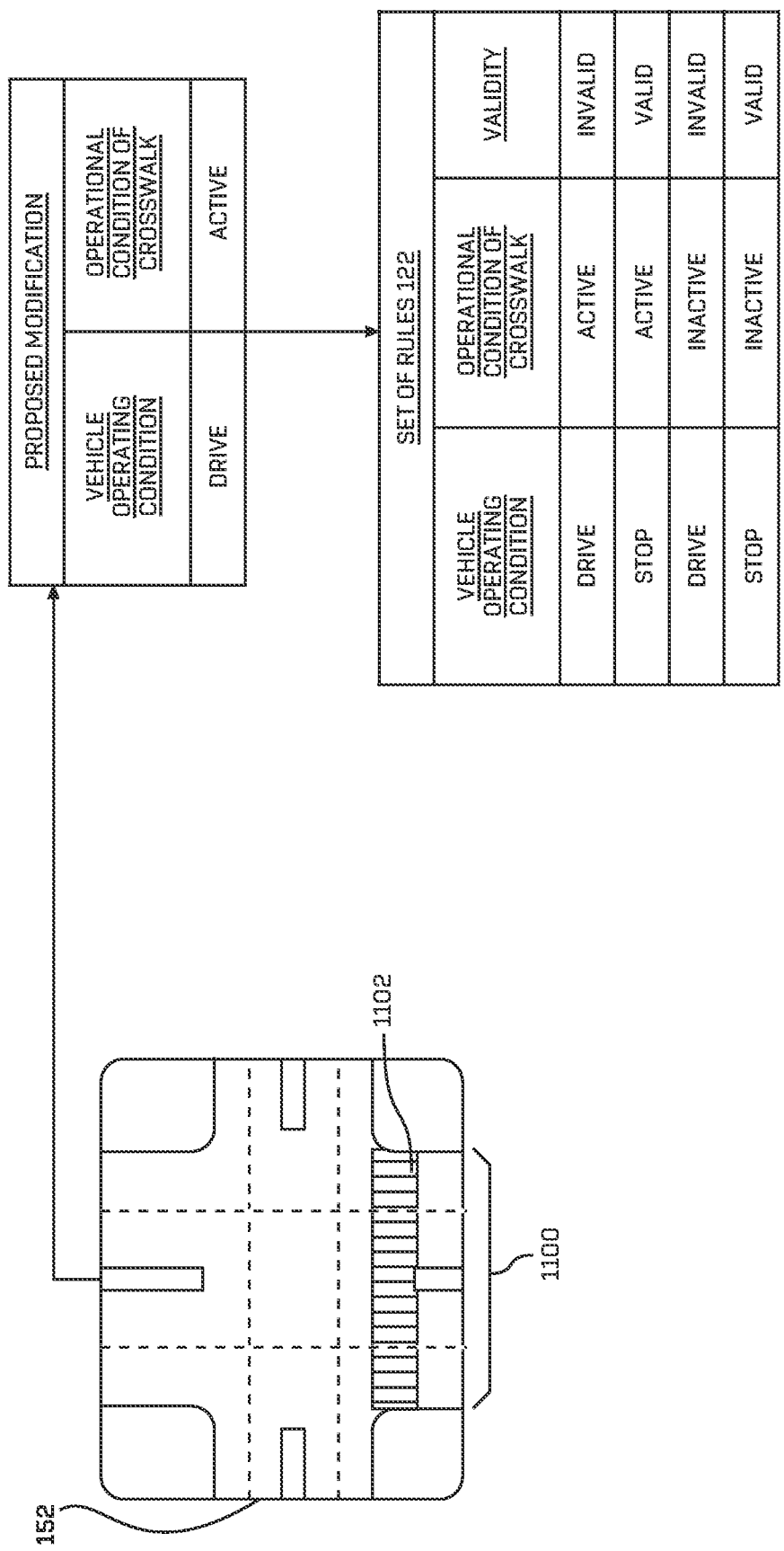
FIG. 11 is a schematic illustration of a modification request to add a relationship between a vehicle and a crosswalk to a road network map.

In the example of FIG. 11, the portion 152 of the road network map 120 can comprise a road segment 1100 and a crosswalk 1102. A request to modify the portion 152 of the road network map 120 can comprise a request to add a vehicle operating condition with respect to a corresponding operational condition of the crosswalk 1102. For example, the request to modify the portion 152 of the road network map 120 can comprise a request to associate a "drive" vehicle operating condition with a "crosswalk active" operational condition of the crosswalk 1102. However, in some locations such an association can be considered to be invalid. The processor(s) 108 of the first computing device 102 can operate in the same manner described previously to compare the request to the set of rules 122 for the given location, to determine whether the request is valid or invalid.

In some examples, the set of rules 122 can comprise a multi-layer or cascaded set of rules, for example taking into account one or more of Federal laws, State laws, and local and municipal laws associated with a corresponding location.

In some examples, a single road segment can span two bounded areas, with the first and second bounded areas comprising corresponding first and second sets of rules. A request to modify the road segment, or a relationship associated with the road segment, can be determined to be invalid, or the road network map can be determined to be invalid, based at least in part on only one of the first and second sets of rules. Alternatively, both the first and second sets of rules can be used to determine validity of the requested modification or the road network map 120. Where the first and second sets of rules are considered to conflict with one another, neither of the first and second sets of rules may be utilised to determine validity of the requested modification or the road network map 120. In such circumstances, a database containing appropriate boundary conditions can be consulted to determine validity of the requested modification or the road network map 120. Such a database can be populated by an owner of the road network map 120, for example.

In some examples, the first computing device(s) 102 can compare the set of rules 122 to a further set of rules to identify conflicting rules. For example, the set of rules 122 can comprise rules defined by local laws or legislation, whilst the further set of rules can comprise a set of rules defined by an owner of the road network map 120. Such a comparison can then identify those rules defined by the owner of the road network map 120 that are in conflict with rules defined by local law or legislation, enabling the owner of the road network map 120 to modify the list of rules they have defined accordingly.

Whilst a variety of elements of the road network map 120 and a variety of associated modification requests have been discussed above, it will be appreciated that other modification requests to other elements of the road network map 120 are also envisaged to be compared to the set of location based rules 122.

Figure 12:
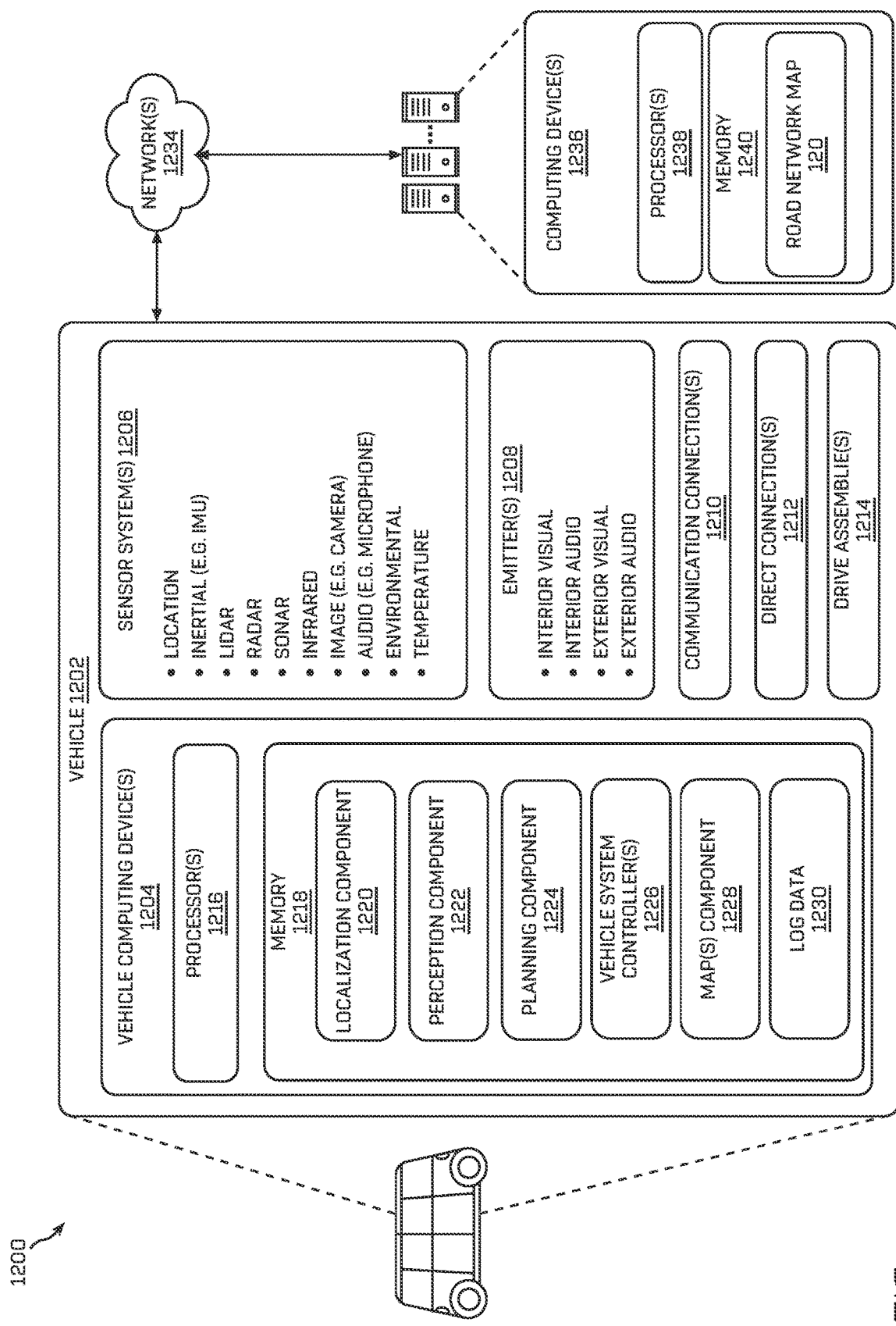
FIG. 12 is a second schematic illustration of a system comprising a vehicle and one or more computing device(s).

FIG. 12 is a block diagram illustrating an example system 1200 for implementing some of the various technologies described herein. In some examples, the system 1200 may include one or multiple features, components, and/or functionality of examples described herein with reference to other figures.

The system 1200 may include a vehicle 1202. In some examples, the vehicle 1202 can include some or all of the features, components, and/or functionality described above with respect to the vehicle 106. The vehicle 1202 can comprise a bidirectional vehicle. As shown in FIG. 12, the vehicle 1202 can also include a vehicle computing device 1204, one or more sensor systems 1206, one or more emitters 1208, one or more communication connections 1210, one or more direct connections 1212, and/or one or more drive assemblies 1214.

The vehicle computing device 1204 can, in some examples, include one or more processors 1216 and memory 1218 communicatively coupled with the one or more processors 1216. In examples, the one or more processors 1216 may execute instructions stored in the memory 1218 to perform one or more operations on behalf of the one or more vehicle computing devices 1204.

The memory 1218 of the one or more vehicle computing devices 1204 can store a localization component 1220, a perception component 1222, a planning component 1224, one or more vehicle system controllers 1226, a map(s) component 1228, and log data 1230. Though depicted in FIG. 12 as residing in memory 1218 for illustrative purposes, it is contemplated that the localization component 1220, perception component 1222, planning component 1224, one or more vehicle system controllers 1226, map(s) component 1228, and/or the log data 1230 can additionally, or alternatively, be accessible to the vehicle 1202 (e.g., stored on, or otherwise accessible from, memory remote from the vehicle 1202, such as memory 1240 of one or more computing devices 1236).

In at least one example, the localization component 1220 can include functionality to receive data from the sensor system(s) 1206 to determine a position and/or orientation of the vehicle 1202 (e.g., one or more of an x-, y-, z-position, roll, pitch, or yaw). For example, the localization component 1220 can include and/or request/receive a map of an environment, for example the road network map 120, and can continuously determine a location and/or orientation of the vehicle 1202 within the map. In some instances, the localization component 1220 can utilize SLAM (simultaneous localization and mapping), CLAMS (calibration, localization and mapping, simultaneously), relative SLAM, bundle adjustment, non-linear least squares optimization, or the like based on image data, lidar data, radar data, IMU data, GPS data, wheel encoder data, and the like captured by the one or more sensor systems 1206 or received from one or more other devices (e.g., computing devices 1236) to accurately determine a location of the vehicle 1202. In some instances, the localization component 1220 can provide data to various components of the vehicle 1202 to determine an initial position of the vehicle 1202 for generating a trajectory and/or for determining to retrieve map data. In various examples, the localization component 1220 can provide data to a web-based application that may generate a data visualization associated with the vehicle 1202 based at least in part on the data.

In some instances, the perception component 1222 can include functionality to perform object tracking, detection, segmentation, and/or classification. In some examples, the perception component 1222 can provide processed sensor data that indicates a presence of an entity that is proximate to the vehicle 1202 and/or a classification of the entity as an entity type (e.g., car, pedestrian, cyclist, animal, building, tree, road surface, curb, sidewalk, unknown, etc.). In additional and/or alternative examples, the perception component 1222 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. In some instances, the perception component 1222 may provide data to a web-based application that generates a data visualization associated with the vehicle 1202 based at least in part on the data.

In general, the planning component 1224 can determine a path for the vehicle 1202 to follow to traverse through an environment. For example, the planning component 1224 can determine various routes and trajectories and various levels of detail. For example, the planning component 1224 can determine a route to travel from a first location (e.g., a current location) to a second location (e.g., a target location). For the purpose of this discussion, a route can be a sequence of waypoints for travelling between two locations. As examples, waypoints may include streets, intersections, global positioning system (GPS) coordinates, etc. Further, the planning component 1224 can generate an instruction for guiding the autonomous vehicle along at least a portion of the route from the first location to the second location. In at least one example, the planning component 1224 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 1202 to navigate.

In at least one example, the vehicle computing device 1204 can include one or more vehicle system controllers 1226, which can be configured to control steering, propulsion, braking, safety, emitters, communication, components, and other systems of the vehicle 1202. These vehicle system controller(s) 1226 can communicate with and/or control corresponding systems of the drive assembly(s) 1214 and/or other components of the vehicle 1202.

The memory 1218 can further include the map(s) component 1228 to maintain and/or update one or more maps, such as the road network map 120, that can be used by the vehicle 1202 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps can include at least one map (e.g., images and/or a mesh). In some examples, the vehicle 1202 can be controlled based at least in part on the maps. That is, the maps can be used in connection with the localization component 1220, the perception component 1222, and/or the planning component 1224 to determine a location of the vehicle 1202, identify objects in an environment, and/or generate routes and/or trajectories to navigate within an environment. Additionally, the maps can be used in connection with the web-based application to generate content associated with the vehicle 1202, such as a data visualization.

In some examples, the one or more maps, such as the road network map 120, can be stored on a remote computing device(s) 1236 (accessible via one or more network(s)). In some examples, multiple maps can be stored based on, for example, a characteristic (e.g., type of entity, time of day, day of week, season of the year, etc.). Storing multiple maps can have similar memory requirements but increase the speed at which data in a map can be accessed. In some examples, the one or more maps can be generated in accordance with the methods described herein.

The memory 1218 may also store log data 1230 associated with the vehicle. For instance, the log data 1230 may include one or more of diagnostic messages, notes, routes, etc. associated with the vehicle. By way of example, if information associated with a notification (e.g., diagnostic message) that is presented on a system interface of the user interface is copied and saved, the information may be stored in the log data 1230.

In some instances, aspects of some or all of the memory-stored components discussed herein can include any models, algorithms, and/or machine learning algorithms. For example, in some instances, components in the memory 1218 such as the localization component 1220, the perception component 1222, and/or the planning component 1224 can be implemented as a neural network.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatter-plot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 1206 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), image sensors (e.g., camera, RGB, IR, intensity, depth, etc.), audio sensors (e.g., microphones), wheel encoders, environment sensors (e.g., temperature sensors, humidity sensors, light sensors, pressure sensors, etc.), temperature sensors (e.g., for measuring temperatures of vehicle components), etc. The sensor system(s) 1206 can include multiple instances of each of these or other types of sensors. For instance, the lidar sensors can include individual lidar sensors located at the corners, front, back, sides, and/or top of the vehicle 1202. As another example, the image sensors can include multiple image sensors disposed at various locations about the exterior and/or interior of the vehicle 1202. As an even further example, the audio sensors can include multiple audio sensors disposed at various locations about the exterior and/or interior of the vehicle 1202. Additionally, the audio sensors can include an array of a plurality of audio sensors for determining directionality of audio data. The sensor system(s) 1206 can provide input to the vehicle computing device 504. Additionally, or alternatively, the sensor system(s) 1206 can send sensor data, via the one or more networks 1234, to the one or more computing device(s) 1236 at a particular frequency, after a lapse of a predetermined period of time, in near real-time, etc.

The vehicle 1202 can also include one or more emitters 1208 for emitting light and/or sound. The emitters 1208 in this example include interior audio and visual emitters to communicate with passengers of the vehicle 1202. By way of example, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 1208 in this example also include exterior emitters. By way of example, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 1202 can also include one or more communication connection(s) 1210 that enable communication between the vehicle 1202 and one or more other local or remote computing device(s). For instance, the communication connection(s) 1210 can facilitate communication with other local computing device(s) on the vehicle 1202 and/or the drive assembly(s) 1214. Also, the communication connection(s) 1210 can allow the vehicle 1202 to communicate with other nearby computing device(s) (e.g., other nearby vehicles, traffic signals, laptop computers, etc.). The communications connection(s) 1210 also enable the vehicle 1202 to communicate with a remote teleoperations system or other remote services.

The communications connection(s) 1210 can include physical and/or logical interfaces for connecting the vehicle computing device(s) 1204 to another computing device (e.g., computing device(s) 1236) and/or a network, such as network(s) 1234. For example, the communications connection(s) 1210 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the direct connection 1212 of vehicle 1202 can provide a physical interface to couple the one or more drive assembly(s) 1214 with the body of the vehicle 1202. For example, the direct connection 1212 can allow the transfer of energy, fluids, air, data, etc. between the drive assembly(s) 1214 and the vehicle 1202. In some instances, the direct connection 1212 can further releasably secure the drive assembly(s) 1214 to the body of the vehicle 1202.

In at least one example, the vehicle 1202 can include one or more drive assemblies 1214. In some examples, the vehicle 1202 can have a single drive assembly 1214. In at least one example, if the vehicle 1202 has multiple drive assemblies 1214, individual drive assemblies 1214 can be positioned on opposite longitudinal ends of the vehicle 1202 (e.g., the leading and trailing ends, the front and the rear, etc.).

The drive assembly(s) 1214 can include many of the vehicle systems and/or components, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive assembly(s) 1214 can include a drive assembly controller which can receive and preprocess data from the sensor system(s) and to control operation of the various vehicle systems. In some examples, the drive assembly controller can include one or more processors and memory communicatively coupled with the one or more processors. The memory can store one or more systems to perform various functionalities of the drive assembly(s) 1214. Furthermore, the drive assembly(s) 1214 can also include one or more communication connection(s) that enable communication by the respective drive assembly with one or more other local or remote computing device(s). In such a manner parameters relating to the drive assembly(s) 1214, for example relating to the high voltage battery, can be transmitted to the computing device 1236.

The computing device(s) 1236 can include one or more processors 1238 and memory 1240 that may be communicatively coupled to the one or more processors 1238. The memory 1240 can store the road network map 120 described herein, with the vehicle 1202 able to obtain the road network map 120 from memory 1240.

The processor(s) 1216 of the vehicle 1202 and the processor(s) 1238 of the computing device(s) 1236 can be any suitable processor capable of executing instructions to process data and perform operations as described herein. By way of example and not limitation, the processor(s) 1216 and 1238 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 1218 and 1240 are examples of non-transitory computer-readable media. The memory 1218 and 1240 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component. It should be noted that while FIG. 12 is illustrated as a distributed system, in alternative examples, components of the vehicle 1202 can be associated with the computing device(s) 1236 and/or components of the computing device(s) 1236 can be associated with the vehicle 1202. That is, the vehicle 1202 can perform one or more of the functions associated with the computing device(s) 1236, and vice versa.

EXAMPLE CLAUSES

A: A system comprising: one or more memories storing a road network map for use with an autonomous vehicle traversing the road network map, and a set of rules associated with a corresponding bounded area of the road network map; and one or more processors configured to: retrieve the road network map from the one or more memories; display, via a graphical user interface, a graphical representation of the road network map; receive, via an input device and through use of the graphical user interface, a request to modify or validate the road network map at a location within the bounded area; determine, based at least in part on the location being within the bounded area, that the set of rules applies to the request; and determine, based at least in part on the set of rules, that the requested modification or the road network map is invalid; wherein the one or more processors are configured to, based at least in part on the requested modification, or the road network map, being invalid: inhibit modification of the road network map according to the requested modification; or display a notification to the user making the request to validate the road network map, via the graphical user interface, that the road network map violates the set of rules.

B. The system of clause A, wherein the road network map comprises a road segment spanning first and second bounded areas, the first and second bounded areas associated with corresponding first and second sets of rules, the request comprises a request to modify or validate the road segment, and the one or more processors are configured to determine, based at least in part on only one of the first and second sets of rules, that the requested modification, or the road network map, is invalid.

C. The system of clause A, wherein the one or more processors are configured to, where the requested modification, or the road network map, is determined to be invalid, provide an indication to the user on the graphical user interface, and the indication comprises one or more of an error message, a visual representation of the invalid modification request, and a proposed alternative modification to the road network map that complies with the set of rules for the bounded area of the road network map.

D. The system of clause A, wherein: the road network map comprises first and second road segments, and first and second data structures associated with the first and second road segments, the first and second data structures to store data representative of one or more relationships between the first and second road segments, the one or more relationships indicative of a possible trajectory or possible drivable area between the first and second road segments; and the request comprises at least one of a request to modify existing data stored by one or more of the first and second data structures, a request to add new data to one or more of the first and second data structures, and a request to validate existing data stored by one or more of the first and second data structures.

E. The system of clause A, wherein the system comprises an autonomous vehicle comprising one or more drive units, and one or more vehicle processors, the one or more vehicle processors configured to: obtain the road network map; and operate, based at least in part on the road network map, the one or more drive units to drive the autonomous vehicle.

F. A method comprising: receiving, at one or more processors, a request to modify or validate a road network map at a location within the road network map; determining, using the one or more processors and based at least in part on the location being within a bounded area of the road network map, that a set of rules applies to the request, the set of rules associated with the bounded area of the road network map; determining, using the one or more processors and based at least in part on the set of rules, that the requested modification, or the road network map, is invalid; and based at least in part on the requested modification, or the road network map, being invalid, inhibiting, using the one or more processors, modification of the road network map according to the request to modify the road network map, or displaying a notification to a user making the request to validate the road network map that the road network map violates the set of rules.

G. The method of clause F, wherein the method comprises providing, via a graphical user interface, an indication to a user making the requested modification that the requested modification is invalid.

H. The method of claim G, wherein the indication comprises one or more of an error message, a visual representation of the invalid request, and a proposed modification to the road network map that complies with the set of rules for the bounded area of the road network map.

I. The method of clause F, wherein the method comprises obtaining an update to the set of rules, updating the set of rules, based at least in part on the update, to obtain an updated set of rules, and validating the road network map against the updated set of rules.

J. The method of clause F, wherein: the road network map comprises first and second elements, and first and second data structures associated with the first and second elements, the first and second data structures to store data representative of one or more relationships between the first and second elements; and the request comprises at least one of a request to modify existing data stored by one or more of the first and second data structures, a request to add new data to one or more of the first and second data structures, and a request to validate existing data stored by one or more of the first and second data structures.

K. The method of clause F, wherein: the road network map comprises first and second road segments; and the request comprises a request to define or validate a relationship between the first and second road segments, the relationship defining a possible trajectory, or a possible drivable area of a vehicle, from the first road segment to the second road segment.

L. The method of clause F, wherein the set of rules comprises a cascaded set of rules based at least in part on a hierarchy of rules for given levels of governmental structure for the corresponding bounded area.

M. The method of clause F, wherein the road network map comprises a road segment spanning first and second bounded areas, the first and second bounded areas associated with corresponding first and second sets of rules, the request comprises a request to modify or validate the road segment, and method comprises determining, using the one or more processors and based at least in part on only one of the first and second sets of rules, that the requested modification or the road network map is invalid.

N. The method of clause F, wherein: the road network map comprises a road segment and a data structure associated with the road segment, the data structure to store data representative of one or more road attributes associated with the road segment and data representative of one or more possible trajectories or possible drivable areas of a vehicle relative to the road segment; the request comprises at least one of a request to modify existing data stored by the data structure, a request to add new data to the data structure, and a request to validate existing data stored by the data structure.

O. The method of clause N, wherein; the one or more road attributes associated with the road segment comprise one or more of a road type associated with the road segment and a lane boundary marking associated with the road segment; the request comprises a request to add, modify, or verify a possible trajectory, or a possible drivable area of a vehicle, for the road segment, the possible trajectory or possible drivable area indicative of one or more of a lane departure relative to the road segment and the vehicle stopping relative to the road segment; and determining that the requested modification or the road network map is invalid comprises determining that the possible trajectory or possible drivable area does not correspond to one or more pre-defined trajectories or one or more pre-defined possible drivable areas for the bounded area to which the road segment belongs, the pre-defined trajectories or the pre-defined possible drivable areas complying with the set of rules.

P. The method of clause F, wherein: the road network map comprises a road segment, one or more traffic control elements associated with the road segment, and one or more data structures to store one or more of data representative of relationships between one or more possible vehicle trajectories or one or more possible drivable areas relative to the road segment, and one or more operational conditions of the one or more traffic control elements; the request comprises a request to add, modify, or validate, a possible relationship between the one or more possible vehicle trajectories or the one or more possible drivable areas and the one or more operational conditions of the one or more traffic control elements; and determining that the requested modification or the road network map is invalid comprises determining that the possible relationship does not correspond to one or more predetermined relationships for the bounded area to which the road segment belongs, the one or more predetermined relationships complying with the set of rules.

Q. The method of clause F, wherein: the road network map comprises a road segment, one or more traffic control elements associated with the road segment, and one or more data structures to store one or more operational conditions of the one or more traffic control elements, and to store data representative of relationships between a vehicle operating condition and one or more operational conditions of the one or more traffic control elements; the request comprises a request to add, modify, or validate, a possible relationship between one or more vehicle operating conditions and one or more operational conditions of the one or more traffic control elements; and determining that the requested modification or the road network map is invalid comprises determining that the possible relationship does not correspond to one or more predetermined relationships for the bounded area to which the road segment belongs, the one or more predetermined relationships complying with the set of rules.

R. One or more non-transitory computer-readable media storing instructions executable by one or more processors, wherein the instructions, when executed, cause the one or more processors to perform operations comprising: receiving a request to modify or validate a road network map at a location within the road network map; determining, based at least in part on the location being within a bounded area of the road network map, that a set of rules applies to the request, the set of rules associated with the bounded area of the road network map; determining, based at least in part on the set of rules that the requested modification, or the road network map, is invalid; and based at least in part on the requested modification or the road network map being invalid: inhibiting modification of the road network map according to the requested modification, or displaying a notification to a user making the request that the road network map violates the set of rules.

S. The one or more non-transitory computer-readable media of clause R, wherein the instructions, when executed, cause the one or more processors to perform operations comprising providing, via a graphical user interface, an indication to a user making the request that the requested modification is invalid, wherein the indication comprises one or more of an error message, a visual representation of the invalid request, and a proposed modification to the road network map that complies with the set of rules for the bounded area of the road network map.

T. The one or more non-transitory computer-readable media of clause R, wherein: the road network map comprises a road segment and a data structure associated with the road segment, the data structure to store data representative of one or more road attributes associated with the road segment and data representative of one or more possible trajectories or possible drivable areas of a vehicle relative to the road segment; the one or more road attributes associated with the road segment comprise one or more of a road type associated with the road segment and a lane boundary marking associated with the road segment; the request comprises a request to add, modify or validate a possible trajectory or possible drivable area of a vehicle for the road segment, the possible trajectory or possible drivable area indicative of one or more of a lane departure relative to the road segment and the vehicle stopping relative to the road segment; and determining that the requested modification or the road network map is invalid comprises determining that the possible trajectory or the possible drivable areas corresponds to one or more pre-defined possible trajectories or pre-defined possible drivable areas for the bounded area to which the road segment belongs, the pre-defined possible trajectories or pre-defined possible drivable areas complying with the set of rules.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

What is claimed is:

1. A system comprising:
one or more memories storing a road network map for use with an autonomous vehicle traversing the road network map, and a set of rules associated with a corresponding bounded area of the road network map; and
one or more processors configured to:
retrieve the road network map from the one or more memories;
display, via a graphical user interface, a graphical representation of the road network map;
receive, via an input device and through use of the graphical user interface, a request to modify a road attribute of the road network map at a location within the bounded area, the road attribute comprising one or more of:
a lane boundary,
a connection between lane segments,
a new drivable area,
an area to avoid, or
information associated with a lane segment comprising one or more of a lane type or a speed limit;
determine, based at least in part on the location being within the bounded area, that the set of rules applies to the request;
determine, based at least in part on the set of rules, that the request to modify the road attribute is invalid;
based at least in part on the requested modification being invalid:
inhibit modification of the road network map according to the requested modification; or display a notification to the user making the request to validate the road network map, via the graphical user interface, that the road network map violates the set of rules; and
cause an autonomous vehicle to drive based at least in part on the road network map.

2. The system of claim 1, wherein the road network map comprises a road segment spanning first and second bounded areas, the first and second bounded areas associated with corresponding first and second sets of rules, the request comprises a request to modify or validate the road segment, and the one or more processors are configured to determine, based at least in part on only one of the first and second sets of rules, that the requested modification, or the road network map, is invalid.

3. The system of claim 1, wherein:
the road network map comprises first and second road segments, and first and second data structures associated with the first and second road segments, the first and second data structures to store data representative of one or more relationships between the first and second road segments, the one or more relationships indicative of a possible trajectory or possible drivable area between the first and second road segments; and
the request comprises at least one of a request to modify existing data stored by one or more of the first and second data structures, a request to add new data to one or more of the first and second data structures, and a request to validate existing data stored by one or more of the first and second data structures.

4. The system of claim 1, wherein the system comprises an autonomous vehicle comprising one or more drive units, and one or more vehicle processors, the one or more vehicle processors configured to:
obtain the road network map; and
operate, based at least in part on the road network map, the one or more drive units to drive the autonomous vehicle.

5. The system of claim 1, wherein the graphical user interface is remote from the vehicle.

6. The system of claim 1, wherein the request to modify the road attribute is a request input into the graphical user interface by a user, the user remote from the vehicle.

7. The system of claim 1, wherein the one or more processors are configured to, where the requested modification is determined to be invalid:
determine a proposed alternative modification to the road attribute based at least in part on the set of rules;
receive, via the user interface, an indication of acceptance of the proposed alternative modification; and
updating the road network map based at least in part on the proposed alternative modification.

8. A method comprising:
receiving, at one or more processors, a request to modify a road attribute of a road network map at a location within the road network map, the road attribute comprising one or more of:
a lane boundary,
a connection between lane segments,
a new drivable area,
an area to avoid, or
information associated with a lane segment comprising one or more of a lane type or a speed limit;
determining, using the one or more processors and based at least in part on the location being within a bounded area of the road network map, that a set of rules applies to the request, the set of rules associated with the bounded area of the road network map;

determining, using the one or more processors and based at least in part on the set of rules, that the requested modification is invalid;

based at least in part on the requested modification being invalid, inhibiting, using the one or more processors, modification of the road network map according to the request to modify the road network map, or displaying a notification to a user making the request to validate the road network map that the road network map violates the set of rules; and causing a vehicle to drive based at least in part on the road network map.

9. The method of claim 8, wherein the method comprises providing, via a graphical user interface, an indication to a user making the requested modification that the requested modification is invalid.

10. The method of claim 9, wherein the indication comprises one or more of an error message, a visual representation of the invalid request, and a proposed modification to the road network map that complies with the set of rules for the bounded area of the road network map.

11. The method of claim 8, wherein:

the road network map comprises first and second elements, and first and second data structures associated with the first and second elements, the first and second data structures to store data representative of one or more relationships between the first and second elements; and the request comprises at least one of a request to modify existing data stored by one or more of the first and second data structures, a request to add new data to one or more of the first and second data structures, and a request to validate existing data stored by one or more of the first and second data structures.

12. The method of claim 8, wherein:

the road network map comprises first and second road segments; and the request comprises a request to define or validate a relationship between the first and second road segments, the relationship defining a possible trajectory, or a possible drivable area of a vehicle, from the first road segment to the second road segment.

13. The method of claim 8, wherein the set of rules comprises a cascaded set of rules based at least in part on a hierarchy of rules for given levels of governmental structure for the corresponding bounded area.

14. The method of claim 8, wherein the road network map comprises a road segment spanning first and second bounded areas, the first and second bounded areas associated with corresponding first and second sets of rules, the request comprises a request to modify or validate the road segment, and method comprises determining, using the one or more processors and based at least in part on only one of the first and second sets of rules, that the requested modification or the road network map is invalid.

15. The method of claim 8, wherein:

the road network map comprises a road segment and a data structure associated with the road segment, the data structure to store data representative of one or more road attributes associated with the road segment and data representative of one or more possible trajectories or possible drivable areas of a vehicle relative to the road segment;

the request comprises at least one of a request to modify existing data stored by the data structure, a request to add new data to the data structure, and a request to validate existing data stored by the data structure.

16. The method of claim 15, wherein:

the one or more road attributes associated with the road segment comprise one or more of a road type associated with the road segment and a lane boundary marking associated with the road segment;

the request comprises a request to add, modify, or verify a possible trajectory, or a possible drivable area of a vehicle, for the road segment, the possible trajectory or possible drivable area indicative of one or more of a lane departure relative to the road segment and the vehicle stopping relative to the road segment; and determining that the requested modification or the road network map is invalid comprises determining that the possible trajectory or possible drivable area does not correspond to one or more pre-defined trajectories or one or more pre-defined possible drivable areas for the bounded area to which the road segment belongs, the pre-defined trajectories or the pre-defined possible drivable areas complying with the set of rules.

17. The method of claim 8, wherein:

the road network map comprises a road segment, one or more traffic control elements associated with the road segment, and one or more data structures to store one or more of data representative of relationships between one or more possible vehicle trajectories or one or more possible drivable areas relative to the road segment, and one or more operational conditions of the one or more traffic control elements;

the request comprises a request to add, modify, or validate, a possible relationship between the one or more possible vehicle trajectories or the one or more possible drivable areas and the one or more operational conditions of the one or more traffic control elements; and determining that the requested modification or the road network map is invalid comprises determining that the possible relationship does not correspond to one or more predetermined relationships for the bounded area to which the road segment belongs, the one or more predetermined relationships complying with the set of rules.

18. The method of claim 8, wherein:

the road network map comprises a road segment, one or more traffic control elements associated with the road segment, and one or more data structures to store one or more operational conditions of the one or more traffic control elements, and to store data representative of relationships between a vehicle operating condition and one or more operational conditions of the one or more traffic control elements;

the request comprises a request to add, modify, or validate, a possible relationship between one or more vehicle operating conditions and one or more operational conditions of the one or more traffic control elements; and determining that the requested modification or the road network map is invalid comprises determining that the possible relationship does not correspond to one or more predetermined relationships for the bounded area to which the road segment belongs, the one or more predetermined relationships complying with the set of rules.

19. One or more non-transitory computer-readable media storing instructions executable by one or more processors, wherein the instructions, when executed, cause the one or more processors to perform operations comprising:

receiving a request to modify a road attribute of a road network map at a location within the road network map;

determining, based at least in part on the location being within a bounded area of the road network map, that a set of rules applies to the request, the set of rules associated with the bounded area of the road network map;

determining, based at least in part on the set of rules that the requested modification is invalid;

based at least in part on the requested modification being invalid, inhibiting modification of the road network map according to the requested modification, or displaying a notification to a user making the request that the road network map violates the set of rules; and causing a vehicle to drive based at least in part on the road network map.

20. The one or more non-transitory computer-readable media of claim 19, wherein:

the road network map comprises a road segment and a data structure associated with the road segment, the data structure to store data representative of one or more road attributes associated with the road segment and data representative of one or more possible trajectories or possible drivable areas of a vehicle relative to the road segment;

the one or more road attributes associated with the road segment comprise one or more of a road type associated with the road segment and a lane boundary marking associated with the road segment;

the request comprises a request to add, modify or validate a possible trajectory or possible drivable area of a vehicle for the road segment, the possible trajectory or possible drivable area indicative of one or more of a lane departure relative to the road segment and the vehicle stopping relative to the road segment; and determining that the requested modification or the road network map is invalid comprises determining that the possible trajectory or the possible drivable areas corresponds to one or more pre-defined possible trajectories or pre-defined possible drivable areas for the bounded area to which the road segment belongs, the pre-defined possible trajectories or pre-defined possible drivable areas complying with the set of rules.

* * * * *